US010373325B1

(12) United States Patent
Karsch et al.

(10) Patent No.: US 10,373,325 B1
(45) Date of Patent: Aug. 6, 2019

(54) METHOD FOR AUGMENTING A SCENE IN REAL SPACE WITH PROJECTED VISUAL CONTENT

(71) Applicant: Lightform, Inc., San Francisco, CA (US)

(72) Inventors: Kevin Karsch, San Francisco, CA (US); Rajinder Sodhi, San Francisco, CA (US); Brett Jones, San Francisco, CA (US); Pulkit Budhiraja, San Francisco, CA (US); Phil Reyneri, San Francisco, CA (US); Douglas Rieck, San Francisco, CA (US); Andrew Kilkenny, San Francisco, CA (US); Ehsan Noursalehi, San Francisco, CA (US); Derek Nedelman, San Francisco, CA (US); Laura LaPerche, San Francisco, CA (US); Brittany Factura, San Francisco, CA (US)

(73) Assignee: Lightform, Inc., San Francisco, CA (US)

( * ) Notice: Subject to any disclaimer, the term of this patent is extended or adjusted under 35 U.S.C. 154(b) by 0 days.

(21) Appl. No.: 16/146,679

(22) Filed: Sep. 28, 2018

(51) Int. Cl.
*G01B 11/25* (2006.01)
*G06K 9/32* (2006.01)
(Continued)

(52) U.S. Cl.
CPC .......... *G06T 7/521* (2017.01); *G01B 11/2513* (2013.01); *G06K 9/3241* (2013.01);
(Continued)

(58) Field of Classification Search
None
See application file for complete search history.

(56) References Cited

U.S. PATENT DOCUMENTS

2016/0134851 A1\* 5/2016 Grundhofer ....... G01B 11/2504
348/745
2017/0312032 A1\* 11/2017 Amanatullah ......... A61B 34/10
2017/0352192 A1\* 12/2017 Petrovskaya ......... G06T 19/006

OTHER PUBLICATIONS

Brett R. Jones, "Augmenting Complex Surfaces with Projector-Camera Systems," Master of Science Thesis, University of Illionis at Urbana-Champaign, 2010 (Year: 2010).\*

(Continued)

*Primary Examiner* — Soo Shin
(74) *Attorney, Agent, or Firm* — Run8 Patent Group, LLC; Peter Miller

(57) ABSTRACT

One variation of method includes: serving setup frames to a projector facing a scene; at a peripheral control module comprising a camera facing the scene, recording a set of images during projection of corresponding setup frames onto the scene by the projector and a baseline image depicting the scene in the field of view of the camera; calculating a pixel correspondence map based on the set of images and the setup frames; transforming the baseline image into a corrected color image—depicting the scene in the field of view of the camera—based on the pixel correspondence map; linking visual assets to discrete regions in the corrected color image; generating augmented reality frames depicting the visual assets aligned with these discrete regions; and serving the augmented reality frames to the projector to cast depictions of the visual assets onto surfaces, in the scene, corresponding to these discrete regions.

21 Claims, 8 Drawing Sheets

(51) Int. Cl.
  *G06K 9/46* (2006.01)
  *G06T 19/00* (2011.01)
  *G06T 7/521* (2017.01)
  *G06T 7/536* (2017.01)
(52) U.S. Cl.
  CPC ............ *G06K 9/4652* (2013.01); *G06T 7/536* (2017.01); *G06T 19/006* (2013.01)

(56) References Cited

OTHER PUBLICATIONS

Crasto et al., "The Smart Bookshelf: A study of camera projector scene augmentation of an everyday environment," Proceedings of the 7th IEEE workshop on Applications of Computer Vision, 2005 (Year: 2005).*

* cited by examiner

METHOD FOR AUGMENTING A SCENE IN REAL SPACE WITH PROJECTED VISUAL CONTENT

TECHNICAL FIELD

This invention relates generally to the field of augmented reality and more specifically to a new and useful method for augmenting a scene in real space with projected visual content in the field of augmented reality.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
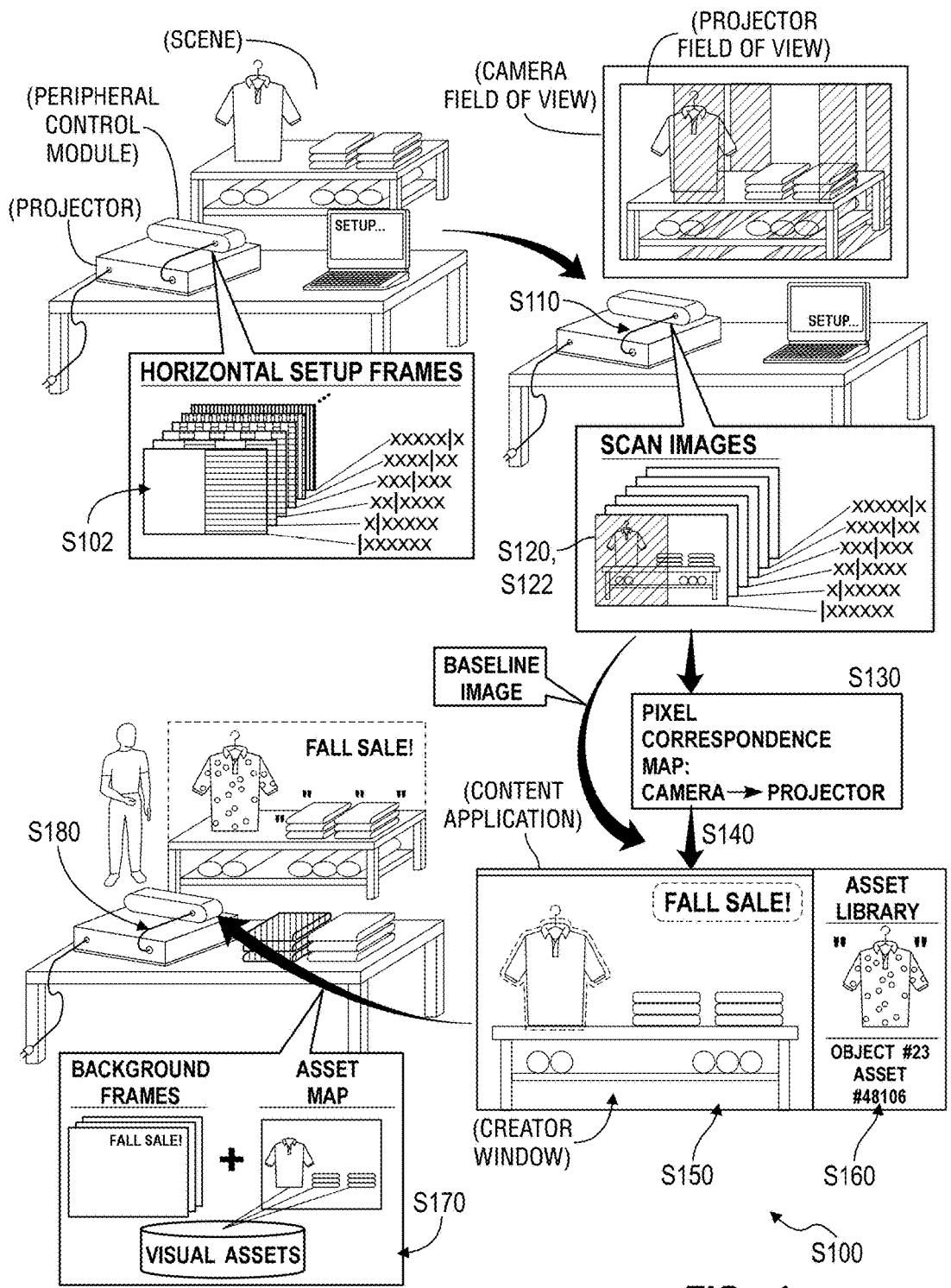
FIG. 1 is a flowchart representation of a method.

As shown in FIG. 1, a method for augmenting a scene in real space with projected visual content includes: serving a sequence of setup frames to an external projector facing the scene in Block S110; at a peripheral control module including a camera facing the scene, recording a set of scan images—each scan image in the set of scan images recorded during projection of a corresponding setup frame in the sequence of setup frames—in Block S120 and recording a baseline image depicting the scene in the field of view of the camera in Block S122; calculating a pixel correspondence map based on pixel values in scan images in the set of scan images and pixel values in corresponding setup frames in the sequence of setup frames in Block S130; transforming the baseline image into a corrected color image based on the pixel correspondence map in Block S140, the corrected color image depicting the scene from a perspective of the external projector; rendering the corrected color image in a creator window at a computing device in Block S150; linking a set of visual assets to a set of discrete regions in the corrected color image in Block S160, each discrete region in the set of discrete regions in the corrected color image spanning a discrete surface in the scene from the perspective of the external projector; generating a sequence of augmented reality frames depicting the set of visual assets aligned with the set of discrete regions in the corrected color image in Block S170; and serving the sequence of augmented reality frames to the external projector for projection onto the scene to cast depictions of the set of visual assets onto corresponding surfaces in the scene in Block S180.

One variation of the method includes: serving a set of setup frames to an external projector facing the scene in Block S110; at a peripheral control module including a camera facing the scene, recording a set of images during projection of corresponding setup frames onto the scene by the external projector in Block S120 and recording a baseline image depicting the scene in the field of view of the camera in Block S122; calculating a pixel correspondence map based on the set of images and the set of setup frames in Block S130; transforming the baseline image into a corrected color image, depicting the scene in the field of view of the camera, based on the pixel correspondence map in Block S140; linking a set of visual assets to a set of discrete regions in the corrected color image in Block S160; generating a set of augmented reality frames depicting the set of visual assets aligned with the set of discrete regions in Block S170; and serving the set of augmented reality frames to the external projector for projection onto the scene to cast depictions of the visual assets onto surfaces, in the scene, corresponding to the set of discrete regions in Block S180.

2. Applications

Generally, the method S100 can be executed by a peripheral control module facing a scene and a content application executing on an external computing device: to record a baseline image of a real-world scene from a 2D camera integrated into the peripheral control module; and to transform this baseline image, which represents a view of the scene from the perspective of the camera, into a corrected color image, which represents a view of the scene from the perspective of an external light projector (hereinafter the "projector") also facing the scene given initial unknown optical characteristics of the projector, an unknown position of the projector relative to the camera, and an unknown position of the projector relative to the scene. The content application can then: render this corrected color image within a creator window at the computing device; interface with a user to assign animated visual assets to discrete regions in the corrected color image depicting discrete surfaces in the scene; and then publish augmented reality frames depicting these animated visual assets to the peripheral control module. While in operation, the peripheral control module can store these augmented reality frames and sequentially output these frames to the projector, which then projects these frames into the scene, thereby casting these animated visual assets onto their corresponding real objects and real surfaces present in the scene with a high degree of spatial accuracy.

In particular, the peripheral control module and the content application can execute Blocks of the method S100 to construct a high-resolution, high-accuracy, hole-filled color representation of the field of view of an external projector of unknown optical characteristics based on: a set of scan images recorded by a single 2D camera in the peripheral control module; and knowledge of setup frames cast onto the scene by the projector when these scan images were recorded by the camera. The content application can then serve this high-resolution, high-accuracy, hole-filled color representation of the field of view of the projector (hereinafter the "corrected color image") to a user and interface with this user to populate regions of this corrected color image depicting discrete surfaces in the scene with digital visual assets, such as from a library of visual assets, within a creator window at the computing device. The content application (and the peripheral control module) can then compile definitions of these regions in the corrected color image and corresponding visual assets directly into augmented reality frames that, when cast onto the scene by the projector, render these visual assets onto their corresponding objects in the scene with a high degree of spatial accuracy, such as with a particular visual asset depicted across a face of a corresponding object and up to an edge of the object in the field of view of the projector but not beyond the edge of the object with single-pixel-level resolution.

For example, the peripheral control module and the content application can cooperate: to automatically derive an offset between a 2D camera in the peripheral control module and a field of view of a projector of unknown type and location; to record a 2D field of view of the camera (e.g., in the form of a 2D "camera-side" image); and to derive a 3D representation (e.g., a non-metrically-accurate 3D image or depth map) of the scene in the field of view of the 2D camera. The content application can: then leverage this depth map to calculate the current field of view of the projector; interface with the user to assign visual animations to objects and surfaces depicted intersecting this depth map; generate a sequence of frames containing these visual animations projected into the calculated field of view of the projector; and publish these frames to the peripheral control module. Upon receipt of these frames from the peripheral control module, the projector can project these frames into the field, thereby rendering augmented visualizations over and aligned with otherwise inanimate, three-dimensional objects in the scene.

Figure 7:
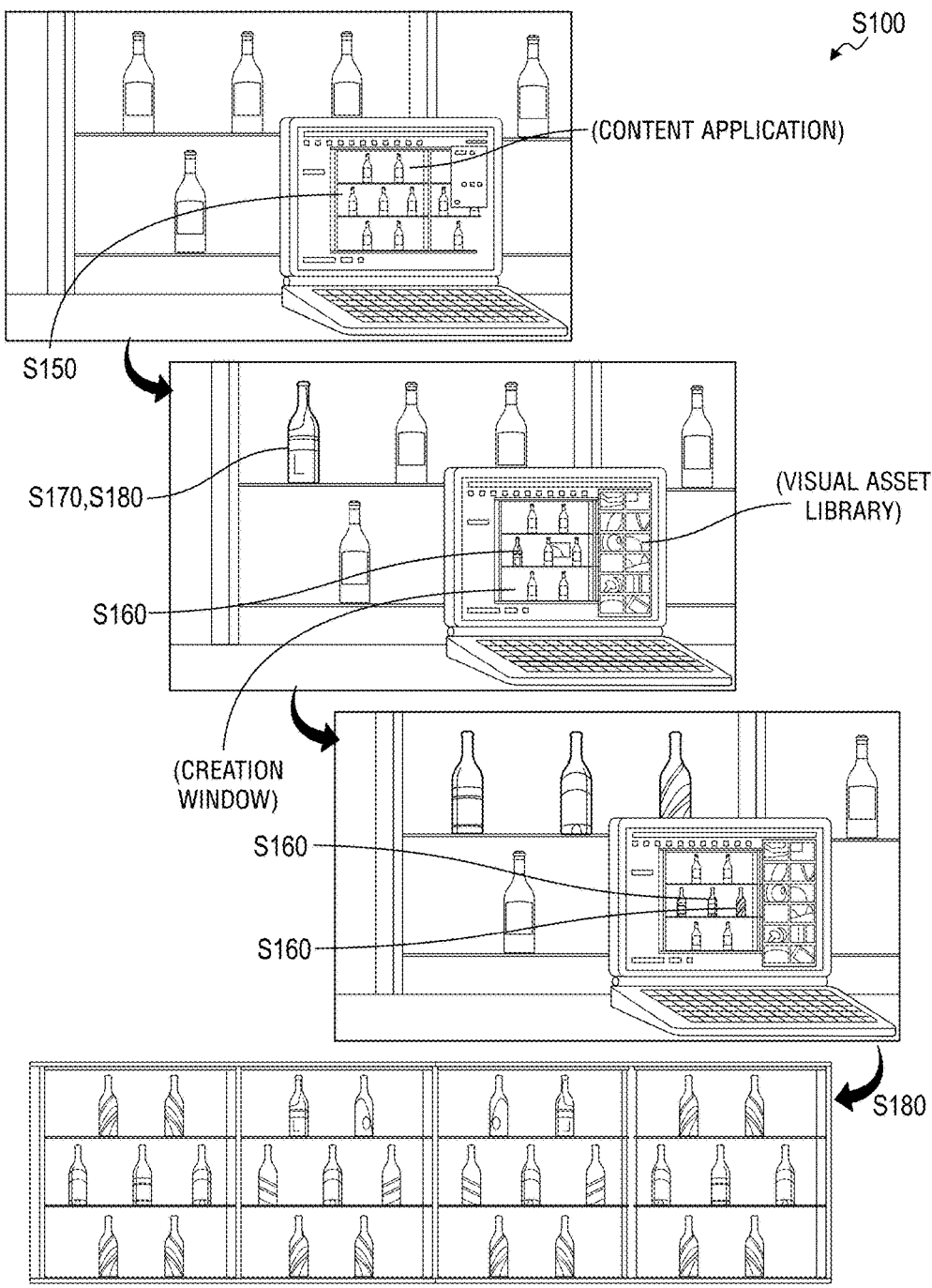
FIG. 7 is a flowchart representation of one variation of the method.
Figure 8:
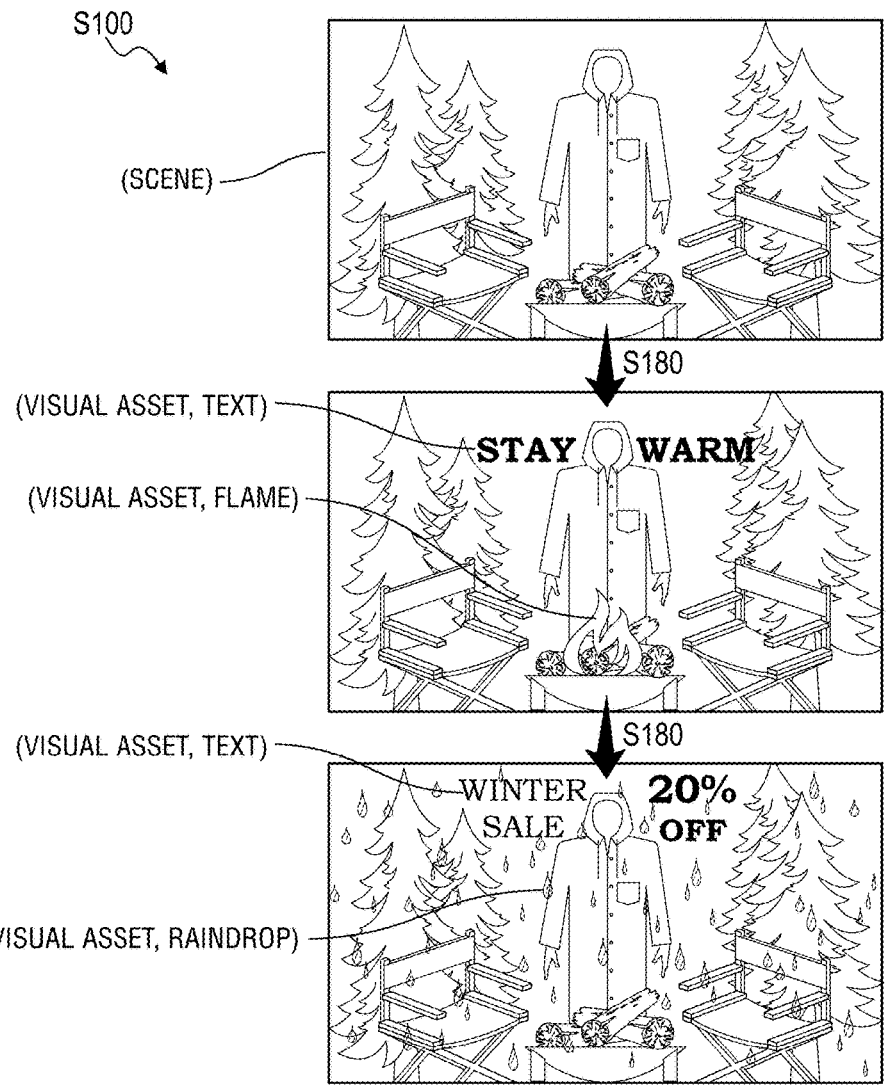
FIG. 8 is a flowchart representation of one variation of the method.

More specifically, the peripheral control module and the content application can: cooperate to automatically construct a 2D or 3D virtual representation of a real-world scene near an external projector; interface with a user to assign animations to discrete surfaces depicted in this 2D or 3D virtual representation of the real-world scene; and then interface with the external projector to project these augmented animations and visualizations onto corresponding surfaces in the scene with a high degree of spatial accuracy without requiring expensive hardware (e.g., multiple cameras or a depth camera in the peripheral control module), rigorous setup procedures (e.g., accurate location of the peripheral control module relate to the external projector), or iteration by the user to manually correct alignment between augmented animations and visualizations output by the projector and corresponding to real objects in the scene. The peripheral control module and the content application can therefore execute the method S100 to enable a user to rapidly and accurately construct compelling projected augmented reality content for a real-world scene with minimal setup time (e.g., a single scan cycle), minimal setup effort (e.g., no manual identification of the projector or its properties, a single scan cycle executed automatically by the peripheral control module), and regardless of whether the user is local to or remote from the projector and peripheral control module, such as shown in FIGS. 1, 7, and 8.

3. System

Figure 9:
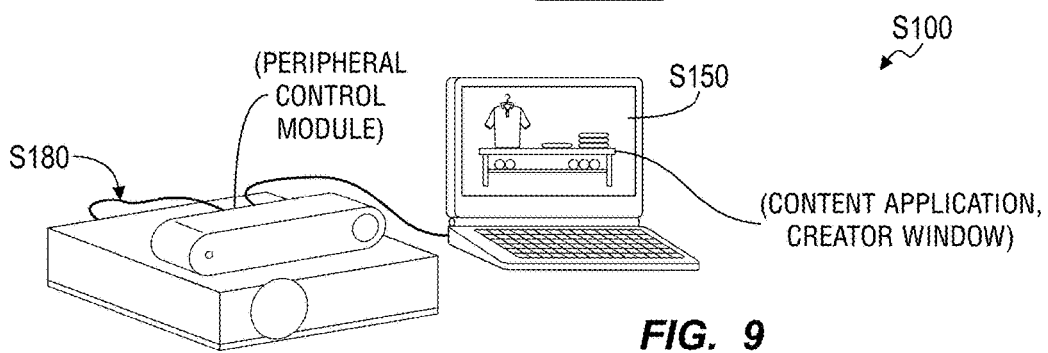
FIG. 9 is a flowchart representation of one variation of the method.

Generally, the method S100 can be executed by the peripheral control module and the content application (hereinafter the "system"), as shown in FIG. 9. The peripheral control module can include: a camera; a processor; a wired or wireless data port configured to send scan images and/or a corrected color images to and to receive augmented reality frames from a computing device executing the content application; a wired or wireless video port configured to couple to an external projector and to serve augmented reality frames generated for a scene to the external projector; and a housing configured to house the camera, the processor, the data port, and the video port. The peripheral control module can further include an infrared transmitter configured to wirelessly transmit commands to an adjacent or connected projector (e.g., to turn the projector on or off).

In one implementation, the camera includes a 2D color (e.g., RGB) camera characterized by a relatively short focal length and therefore a view angle wider than common projectors such that the field of view of the camera is greater than the field of view of a connected projector at similar focal distances. Therefore, when the peripheral control module is grossly (i.e., imprecisely) located on or near a projector of unknown optical properties with the camera and an output lens of the projector generally facing a common scene, the field of view of the camera may be highly likely to contain the complete field of view of the projector. In particular, the camera can include optics characterized by a wide view angle—relative to common projectors—such that the peripheral control module exhibits low sensitivity to placement relative to a projector and thus enabling a user to quickly setup the peripheral control module on or near a projector with minimal time spent adjusting the position of the peripheral control module to locate the field of view of the projector in the field of view of the camera.

The processor can execute Blocks of the method S100— such as Blocks S110, S120, S122, S130, S140, S170, and S180—locally on the peripheral control module. To limit processing complexity, processing power, and processing time during a setup period and during later operation, the camera can be characterized by a resolution less than a minimal resolution of common projectors. For example, the camera can include a six-megapixel color camera. The component placement module (and/or the content application) can then execute methods and techniques described below to fill gaps in a corrected color image—depicting a scene from the perspective of a projector and calculated based on scan images recorded by the camera—resulting from this resolution and view angle mismatch between the camera and a connected external projector.

The housing is further configured to transiently mount directly to an external projector, such as to the top, bottom, side, or front of the projector with the camera facing a scene also in the field of view of the projector. For example, the peripheral control module can be mounted to a projector with double-sided tape or with a hook-and-loop strip. Alternatively, the peripheral control module can be mechanically fastened to a mount adjacent the projector, such as to a wall or ceiling mount supporting the projector.

In one implementation shown in FIG. 9, the housing defines an elongated rectilinear section, and the camera is arranged near one corner of the housing. In this implementation, the peripheral control module can be mounted to a projector in a variety of orientations. For example, in a first horizontal orientation, the corner of the housing occupied by the camera is located nearest the body of the projector in order to limit an offset distance between the camera and the projector fields of view, thereby minimizing areas in the scene that are visible to the camera but not to the projector and similarly minimizing areas in the scene that are visible to the projector but not to the camera. In this example, in a second horizontal orientation, the corner of the housing occupied by the camera is located opposite the body of the projector in order to increase an offset distance between the camera and the projector fields of view, thereby enabling the content application (or the peripheral control module) to calculate a more accurate disparity map between the field of view of the camera and the derived field of view of the projector (but also increasing areas in the scene that are visible to the camera but not to the projector and vice versa). Furthermore, in a third vertical orientation, the corner of the housing occupied by the camera is located opposite the body of the projector in order to maximize an offset distance between the camera and the projector fields of view, thereby enabling the content application (or the peripheral control module) to calculate a disparity map with even greater accuracy (but also further increasing areas in the scene that are visible to the camera but not to the projector and vice versa).

However, the peripheral control module can be configured to mount or rest on any other surface near a scene in the field of view of an external projector.

The content application is configured to execute on a computing device (e.g., a desktop computer, laptop computer, tablet, or smartphone) and defines a virtual environment accessible by a user to link visual assets—such as new, custom visual assets or visual assets contained in an asset library—to discrete regions in a corrected color image corresponding to discrete surfaces, objects, or features in a scene from the perspective of a projector. For example, the content application: can define a native application or a browser application: can host a creator window that renders corrected color images; and can include a tool set for selecting, adjusting, and linking visual assets to discrete regions depicted in corrected color images.

4. Setup Frames

One variation of the method S100 shown in FIG. 1 includes Block S102, which includes: querying the external projector for a resolution of the external projector (e.g., its pixel width and pixel height); generating a sequence of horizontal setup frames at the resolution of the external projector, wherein each horizontal setup frame in the sequence of horizontal setup frames including a unique distribution of alternating columns of black pixels and columns of white pixels; and similarly generating a sequence of vertical setup frames.

In one implementation, the peripheral control module then generates a first horizontal setup frame including a first array of pixels at the resolution of the external projector, wherein each pixel in the first array of pixels including a "0" value in a first characteristic position of a binary horizontal address of the pixel is assigned a black pixel value, and wherein each pixel in the first array of pixels including a "1" value in the first characteristic position of a binary horizontal address of the pixel is assigned a white pixel value. Similarly, in this implementation, the peripheral control module can generate a second horizontal setup frame including a second array of pixels at the resolution of the external projector, wherein each pixel in the second array of pixels including a "0" value in a second characteristic position of a binary horizontal address of the pixel is assigned a black pixel value, and wherein each pixel in the second array of pixels including a "1" value in the second characteristic position of a binary horizontal address of the pixel is assigned a white pixel value. The peripheral control module can repeat this process to generate a set of horizontal setup frames for each characteristic position of binary horizontal addresses of pixel columns in the projector. The peripheral control module can similarly generate a set of vertical setup frames for each characteristic position of binary vertical addresses of pixel columns in the projector.

4.1 Setup Frame Initialization

In one example, for a projector with a horizontal resolution of 1280×800 (i.e., 1280 pixel columns and Boo pixel rows), the peripheral control module initializes 1280×800 setup images for the projector, wherein each pixel column in these setup images is encoded with a binary value (e.g., a "pattern of bits"), including:

"00000000000" for pixel column 0;
"00000000001" for pixel column 1; . . . ;
"00001100100" for pixel column 100; . . . ;
"01110000100" for pixel column 900; . . . ;
"10011111110" for pixel column 1278; and
"10011111111" for pixel column 1279.

Similarly, the peripheral control module can encode each pixel row in these setup images with a binary value, including:

"00000000000" for pixel row 0;
"00000000001" for pixel row 1; . . . ;
"00001100100" for pixel row 100; . . . ;
"00101011100" for pixel row 348; . . . ;
"01100011110" for pixel row 798; and
"01100011111" for pixel row 799.

Therefore, for the projector characterized by a resolution of 1280×800: pixel (0,0) in a setup image can be assigned graycode values (0000000000, 00000000000); pixel (1,0) in the setup image can be assigned graycode values (00000000001, 00000000000); and pixel (100,1) in the setup image can be assigned graycode values (00001100100, 00000000001); etc.

4.2 Horizontal Setup Frames

Figure 3:
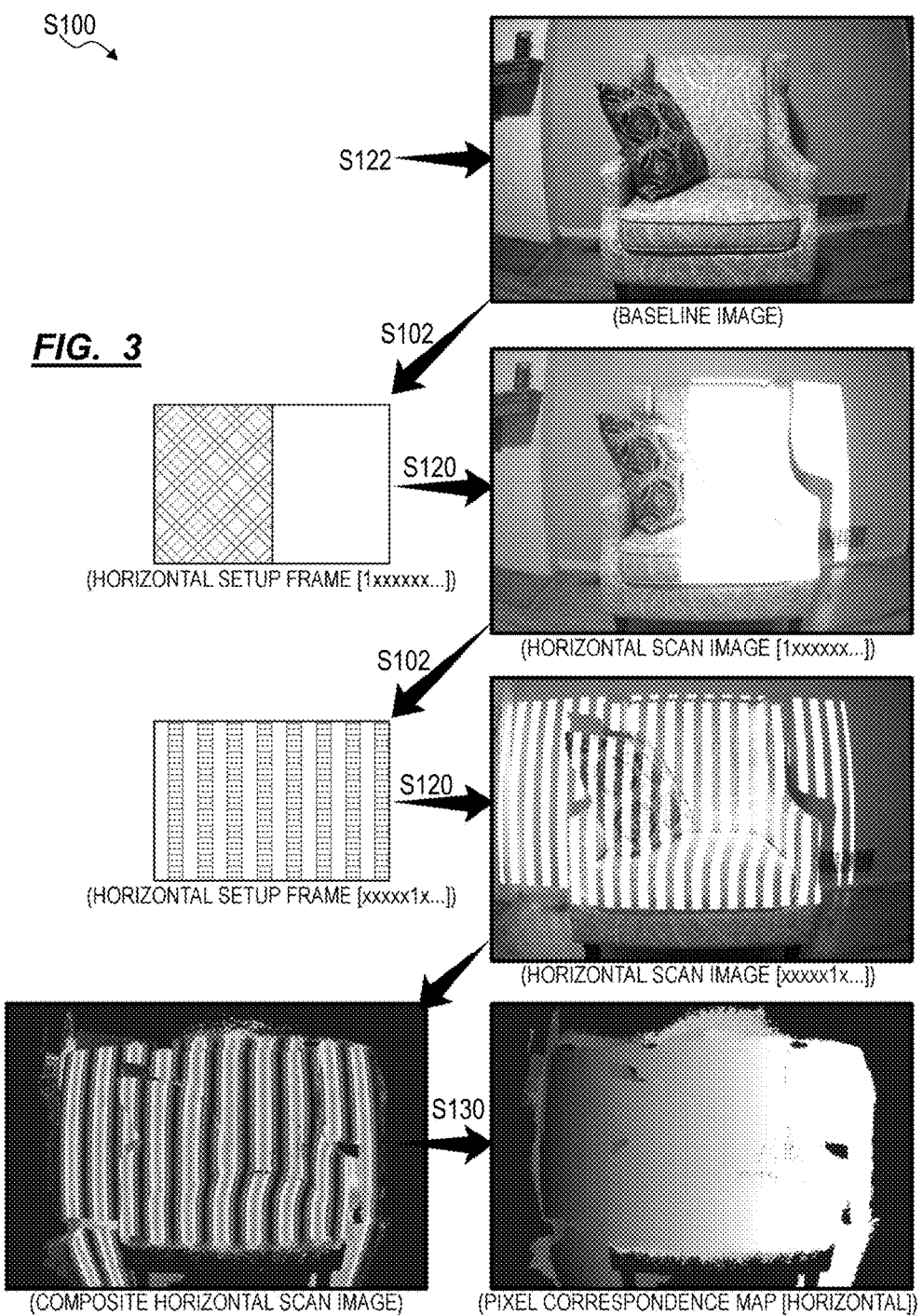
FIG. 3 is a flowchart representation of one variation of the method.

As shown in FIGS. 1 and 3, the system can then generate a set of horizontal setup frames and assign pixel values (e.g., black and white, or "0" and "1" values, respectively) to each pixel in each horizontal setup frame.

In the foregoing example in which the horizontal resolution of the projector is 1280 pixels, the peripheral control module can: define an eleventh horizontal setup frame—in the set of horizontal setup frames—in which all pixel column addresses with a first leftmost bit value of "0" (e.g., "0xxxxxxxxxx" for an eleventh characteristic binary position) are black and in which all pixel column addresses with the first leftmost bit value of "1" (e.g., "1xxxxxxxxxx" for the eleventh characteristic binary position) are white; define a tenth horizontal setup frame—in the set of horizontal setup frames—in which all pixel column addresses with a second leftmost bit value of "0" (e.g., "x0xxxxxxxxx" for a tenth characteristic binary position) are black and in which all pixel column addresses with the second leftmost bit value of "1" (e.g., "x1xxxxxxxxx" for the tenth characteristic binary position) are white; define a ninth horizontal setup frame—in the set of horizontal setup frames—in which all pixel column addresses with a third leftmost bit value of "0" (e.g., "xx0xxxxxxxx" for a ninth characteristic binary position) are black and in which all pixel column addresses with the third leftmost bit value of "1" (e.g., "xx1xxxxxxxx" for the ninth characteristic binary position) are white; . . . ; and define a first horizontal setup frame—in this set of horizontal setup frames—in which all pixel column addresses with a first rightmost bit value of "0" (e.g., "xxxxxxxxxx0" for a first characteristic binary position) are black and in which all pixel column addresses with the first rightmost bit value of "1" (e.g., "x1xxxxxxxx" for the first characteristic binary position) are white.

Therefore, in this example, the peripheral control module can: generate an eleventh horizontal setup frame (e.g., a "low-order" horizontal setup frame) with a left half of pixels in black and with a right half in white; generate a tenth horizontal setup frame with first and third vertical quartiles in black and with second and fourth vertical quartiles in white, from left to right; generate a ninth horizontal setup frame with first, third, fifth, and seventh vertical octiles in black and with second, fourth, sixth, and eighth vertical octiles in white, from left to right); . . . ; and generate a first horizontal setup frame (e.g., a "high-order" horizontal setup frame) in which columns of pixels alternate between black and white with the leftmost pixel column in black.

4.3 Vertical Setup Frames

The system can similarly generate a set of vertical setup frames and assign pixel values (e.g., black and white, or "0" and "1" values, respectively) to each pixel in each vertical setup frame.

In the foregoing example in which the vertical resolution of the projector is Boo pixels, the peripheral control module can: define a tenth vertical setup frame—in a set of vertical setup frames—in which all pixel row addresses with a first topmost bit value of "0" (e.g., "0xxxxxxxxx" for a tenth characteristic binary position) are black and in which all pixel row addresses with the first topmost bit value of "1" (e.g., "1xxxxxxxxx" for the tenth characteristic binary position) are white; define a ninth vertical setup frame—in the set of vertical setup frames—in which all pixel row addresses with a second topmost bit value of "0" (e.g., "x0xxxxxxxx" for a ninth characteristic binary position) are black and in which all pixel row addresses with the second topmost bit value of "1" (e.g., "x1xxxxxxxx" for the ninth characteristic binary position) are white; define an eighth vertical setup frame—in the set of vertical setup frames—in which all pixel row addresses with a third topmost bit value of "0" (e.g., "xx0xxxxxxx" for an eighth characteristic binary position) are black and in which all pixel row addresses with the third topmost bit value of "1" (e.g., "xx1xxxxxxx" for the eighth characteristic binary position) are white; . . . ; and define a first vertical setup frame—in the set of vertical setup frames—in which all pixel row addresses with a first bottommost bit value of "0" (e.g., "xxxxxxxxx0" for a first characteristic binary position) are black and in which all pixel row addresses with the first bottommost bit value of "1" (e.g., "x1xxxxxxxx" for the first characteristic binary position) are white.

Therefore, in this example, the peripheral control module can: generate a tenth vertical setup frame (e.g., a "low-order" vertical setup frame) with a bottom half of pixels in black and with a top half in white; generate a ninth vertical setup frame with first and third vertical quartiles in black and with second and fourth vertical quartiles in white, from bottom to top; generate an eight vertical setup frame with first, third, fifth, and seventh vertical octiles in black and with second, fourth, sixth, and eighth vertical octiles in white, from bottom to top; . . . ; and generate a first vertical setup frame (e.g., a "high-order" vertical setup frame) in which rows of pixels alternate between black and white with the bottommost pixel column in black.

However, the peripheral control module (or the content application) can generate a set of setup frames in any other way and depicting any other graycode pattern.

5. Scan Cycle

Block S110 of the method S100 recites serving a sequence of setup frames to an external projector facing the scene; and Blocks S120 and S122 of the method S100 recite, at a peripheral control module including a camera facing the scene, recording a set of scan images, each scan image in the set of scan images recorded during projection of a corresponding setup frame in the sequence of setup frames and recording a baseline image depicting the scene in the field of view of the camera. Generally, in Block S110, S120, and S122, the system (i.e., the peripheral control module or the content application executing on a connected computing device): outputs a first setup frame to the projector; triggers the camera to record a first scan image; outputs a second setup frame to the projector; triggers the camera to record a second scan image; repeats this process for each setup frame in a set and stores corresponding scan images during a scan cycle; triggers the camera to record a baseline image; and similarly stores the baseline image.

In one implementation shown in FIGS. 1 and 3, the peripheral control module first executes a horizontal scan cycle in Block S120, including: sequentially outputting each horizontal setup frame in set of horizontal setup frames to the projector; triggering the camera to record one 2D color scan image per horizontal setup frame; and storing each of these 2D color scan images (hereinafter the "set of horizontal scan images") in local memory (or serving these scan images to the content application for processing in subsequent Blocks of the method). In particular, in Block S120, the peripheral control module can record a set of horizontal scan images, wherein each horizontal scan image in the set of horizontal scan images is recorded during projection of a corresponding horizontal setup frame in the set of horizontal setup frames generated in Block S102.

Upon conclusion of the horizontal scan cycle, the peripheral control module can execute a vertical scan cycle in Block S120, including: sequentially outputting each vertical setup frame in the set of vertical setup frames to the projector; triggering the camera to record one 2D color scan image per vertical setup frame; and storing each of these 2D color scan images (hereinafter the "set of vertical scan images") in local memory (or serving these scan images to the content application).

However, the peripheral control module can selectively serve horizontal and vertical setup frames and record horizontal and vertical scan images in any other order, such as by alternating between horizontal and vertical setup frames, in Block S120.

5.1 Baseline Image

In Block S122, the peripheral control module records a baseline image of the scene, such as before, during, or after recording horizontal and vertical scan images of the scene. For example, in Block S122, the peripheral control module can trigger the camera to record the baseline image when the projector is off or when the projector is casting an all-black (or "empty) setup frame onto the scene during the scan cycle, as shown in FIG. 3. Alternatively the peripheral control module can serve a "white" frame—such as full or partial brightness—to the projector, which can cast this white frame onto the scene while the peripheral control module triggers the camera to record the baseline image in Block S122.

However, the peripheral control module can implement any other method or technique to record a baseline image of the scan in Block S122.

5.2 Projector Field of View

The scene in the field of view of the projector may include spectral surfaces of unknown reflectivity, and the scene may be under unknown lighting conditions during the scan cycle. If the scene contains highly-reflective surfaces, casting a frame including many bright, white pixels into the field (e.g., a 1280×800 frame with many or all pixels set at maximum brightness, such as a white color value of "255" or an RGB color value or "255, 255, 255") may produce bright reflections (or "glare") across surfaces in the scene outside the field of view of the projector but within the field of view of the camera. Therefore, to prevent interpretation of correspondence between projector pixels and camera pixels outside of the field of view of the projector, the peripheral control module (and/or the content application) can: serve a sequence of boundary mapping frames to the projector; capture a corresponding set of boundary scan images while these boundary mapping frames are output by the projector; and then derive the boundary of the field of view of the projector from these boundary scan images.

Figure 4:
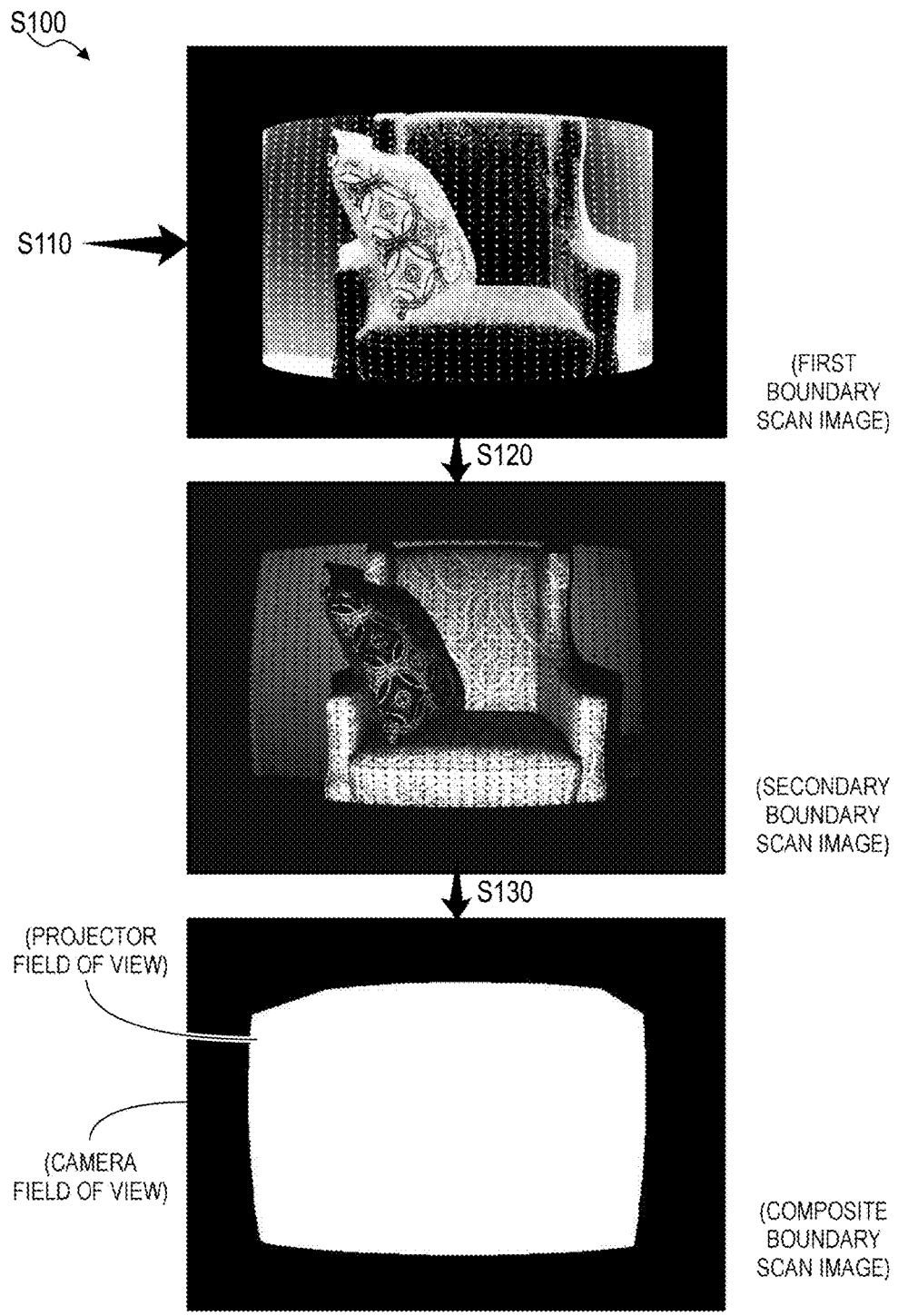
FIG. 4 is a flowchart representation of one variation of the method.

In one implementation shown in FIG. 4, the peripheral control module generates a first boundary mapping frame depicting a sparse grid array of white dots over a black background and a second boundary mapping frame that is the inverse of the first boundary mapping frame. For example, the first boundary mapping frame can include clusters of white pixels at full-brightness (e.g., clusters of pixels assigned RGB values of "255, 255, 255") uniformly distributed across its area and up to its perimeter with fewer than 5% of all pixels in the first boundary mapping frame assigned this white value; all other pixels in the boundary mapping frame can be set to a "black" or "minimum brightness" value (e.g., assigned RGB values of "0, 0, 0"). The peripheral control module can then serve the first boundary mapping frame to the external projector; and record a first boundary scan image during projection of the first boundary mapping frame onto the scene by the external projector, which limits a total amount of light projected into the scene and therefore limits reflected (or "bounced") light and glare while also projecting a detectable grid array of white dots across the scene while the first boundary scan image is recorded. The peripheral control module can similarly serve the second boundary mapping frame to the external projector; and record a second boundary scan image during projection of the second boundary mapping frame by the external projector, which may produce significantly greater reflected light and more glare across the scene than when the first boundary scan image. is cast onto the scene by the projector.

In this implementation, the peripheral control module can then: convert the first boundary scan image and the second boundary scan image to black and white; and subtract the second boundary scan image from the first boundary scan image (i.e., execute pixel-wise subtraction of pixel values in the second boundary scan image from corresponding pixels values in the first boundary scan image) to calculate a composite boundary scan image. Generally, pixels in this composite boundary scan image corresponding to camera pixels defining fields of view intersecting the projected pattern of white dots in the first boundary mapping frame may contain high pixel values (e.g., black-and-white value of "1"). All other pixels in the composite boundary scan image may contain low pixel values, such as: a black-and-white value of "0" for pixels corresponding to camera pixels defining fields of view intersecting surfaces in the scene not illuminated by either of the first or second boundary mapping frames and reflecting minimal light during projection of the second boundary mapping frame; and a black-and-white value of "−1" for pixels corresponding to camera pixels defining fields of view intersecting surfaces in the scene not illuminated by either the first or second boundary mapping frames but reflecting substantive light when the second boundary mapping frame is cast onto the scene.

Therefore, the peripheral control module can: isolate a set of pixel clusters in the composite boundary scan image that contain values greater than a threshold value (e.g., "0.5"); calculate a perimeter that encompasses this set of pixel clusters; and store this perimeter as a boundary of the scene in the field of view of the projector. For example, the peripheral control module can calculate a smooth or linearly-interpolated perimeter of maximum area that encompasses all pixel clusters in this set of clusters in the composite boundary scan image.

The peripheral control module can then crop the set of scan images and/or crop the pixel correspondence map to this derived perimeter of the field of view of the projector, such as described below. For example, the peripheral control module can transform pixels in the baseline image—contained inside the perimeter exclusively—into the corrected color image based on the pixel correspondence map in Block S140 in order to eliminate any opportunity for deriving correspondence between camera pixels and an area in the scene that falls outside of the field of view of the projector.

6. Pixel Correspondence from Camera Domain to Projector Domain

Block S130 of the method S100 recites calculating a pixel correspondence map based on pixel values in scan images in the set of scan images and pixel values in corresponding setup frames in the sequence of setup frames. Generally, in Block S130, the peripheral control module locally calculates a pixel correspondence map that links pixels in the field of view of the camera that exhibit fields of view to pixels of the projector exhibiting overlapping fields of view within the scene based on the set of scan images and corresponding setup frames. (Alternatively, the peripheral control module can serve scan image and setup frame data to the content application, and the content application can derive the pixel correspondence map in Block S130.)

6.1 Horizontal Pixel Correspondence

In one implementation shown in FIG. 3, the peripheral control module converts each horizontal scan image in the set of horizontal scan images into a black-and-white horizontal scan image, such as with "black" pixels containing the value "0" and with "white" pixels containing the value "1" in the horizontal scan image. The peripheral control module can then compile the set of black-and-white horizontal scan images into a horizontal composite scan image including an array of pixels, such as by weighting the horizontal scan images based on the order of the corresponding setup frame. Each pixel in the horizontal composite scan image can thus: be assigned a pixel address corresponding to a particular pixel in the camera; and include a horizontal pixel value corresponding to a horizontal address of a column of pixels in the external projector that defines a columnar field of view that intersects a field of view of the particular pixel in the camera at a surface in the scene.

For example, in Block S120, the peripheral control module can record an eleventh horizontal scan image while the eleventh horizontal setup frame is output by the projector during the horizontal pixel correspondence scan of the scan cycle. As described above, the eleventh horizontal setup frame can specify a pixel value of "1" for all pixel columns assigned addresses with a bit value of "1" in the eleventh characteristic binary position (i.e., "1xxxxxxxxxx"). The peripheral control module can thus weight the eleventh horizontal scan image—now converted to black-and-white—by multiplying each pixel in the eleventh black-and-white horizontal scan image by $2^{\wedge}(11-1)$, or "1,024," according to the order of the eleventh horizontal setup frame in Block S130.

Similarly, in this example, the peripheral control module can record a tenth horizontal scan image in Block S120 while the tenth horizontal setup frame is output by the projector during the horizontal pixel correspondence scan of the scan cycle. As described above, the tenth horizontal setup frame can specify a pixel value of "1" (or "white") for all pixel columns assigned addresses with the bit value "1" in the tenth characteristic binary position (i.e., "x1xxxxxxxxx"). The peripheral control module can thus weight the tenth horizontal scan image—now converted to black-and-white—by multiplying each pixel in the tenth black-and-white horizontal scan image by $2^{\wedge}(10-1)$, or "512," according to the order of the tenth horizontal setup frame in Block S130.

Finally, the peripheral control module can record a first horizontal scan image in Block S120 while the first horizontal setup frame is output by the projector during the horizontal pixel correspondence scan of the scan cycle. As described above, the first horizontal setup frame can specify a pixel value of "1" (or "white") for all pixel columns assigned addresses with the bit value "1" in the first characteristic binary position (i.e., "xxxxxxxxx1"). The peripheral control module can thus weight the first horizontal scan image—now converted to black-and-white—by multiplying each pixel in the first black-and-white horizontal scan image by $2^{\wedge}(1-1)$, or "1," according to the order of the first horizontal setup frame in Block S130.

The peripheral control module can then sum all of these weighted black-and-white horizontal scan images to generate a composite horizontal scan image, wherein a value in each pixel in this composite horizontal scan image thus corresponds directly to one pixel column in the projector. For example, for the projector exhibiting a horizontal resolution of 1280 pixels, as described above, a pixel value of "0" in the composite horizontal scan image can correspond to the first, leftmost column—or "0" column address—of the projector. Similarly: a pixel value of "143" in the composite horizontal scan image can correspond to the 144th column—or "143" column address—of the projector; and a pixel value of "1279" in the composite horizontal scan image can correspond to the $1280^{th}$, rightmost column—or "1279" column address—of the projector.

6.2 Vertical Pixel Correspondence

The peripheral control module can implement similar methods and techniques in Block S130 to: convert each vertical scan image in the set of vertical scan images into a black-and-white vertical scan image; and then compile the set of black-and-white vertical scan images into a vertical composite scan image including an array of pixels. Each pixel in this vertical composite scan image can thus: be assigned a pixel address corresponding to a particular pixel in the camera; and include a vertical pixel value corresponding to a vertical address of a row of pixels in the external projector that defines a lateral field of view that intersects a field of view of the particular pixel in the camera at a surface in the scene.

In the foregoing example, in Block S120, the peripheral control module can record a tenth vertical scan image while the tenth vertical setup frame is output by the projector during the vertical pixel correspondence scan of the scan cycle. As described above, the tenth vertical setup frame can specify a pixel value of "1" (or "white") for all pixel rows assigned addresses with the bit value "1" in the tenth characteristic binary position (i.e., "1xxxxxxxxx"). The peripheral control module can thus weight the tenth vertical scan image—now converted to black-and-white—by multiplying each pixel in the tenth black-and-white vertical scan image by $2^{\wedge}(10-1)$, or "512," according to the order of the tenth vertical setup frame in Block S130.

Similarly, in this example, the peripheral control module can record a ninth vertical scan image while the ninth vertical setup frame is output by the projector during the vertical pixel correspondence scan of the scan cycle. As described above, the ninth vertical setup frame can specify a pixel value of "1" (or "white") for all pixel rows assigned addresses with the bit value "1" in the ninth characteristic binary position (i.e., "x1xxxxxxxxx"). The peripheral control module can thus weight the ninth vertical scan image—now converted to black-and-white—by multiplying each pixel in the ninth black-and-white vertical scan image by $2^{\wedge}(9-1)$, or "256," according to the order of the ninth vertical setup frame in Block S130.

Finally, the peripheral control module can record a first vertical scan image while the first vertical setup frame is output by the projector during the vertical pixel correspondence scan of the scan cycle. As described above, the first vertical setup frame can specify a pixel value of "1" (or "white") for all pixel rows assigned addresses with the bit value "1" in the first characteristic binary position (i.e., "xxxxxxxxx1"). The peripheral control module can thus weight the first vertical scan image—now converted to black-and-white—by multiplying each pixel in the first black-and-white vertical scan image by $2^{\wedge}(1-1)$, or "1," according to the order of the tenth vertical setup frame in Block S130.

The peripheral control module can then sum all of these weighted black-and-white vertical scan images to generate a composite vertical scan image, wherein a value in each pixel in this composite vertical scan image thus corresponds directly to one pixel row in the projector. For example, for the projector exhibiting a vertical resolution of Boo pixels, as described above, a pixel value of "0" in the black-and-white composite vertical scan image can correspond to the first, bottommost row—or "0" row address—of the projector. Similarly: a pixel value of "143" in the black-and-white composite vertical scan image can correspond to the $144^{th}$ row—or "143" row address—of the projector; and a pixel value of "799" in the black-and-white composite vertical scan image can correspond to the $800^{th}$, topmost row—or "799" row address—of the projector.

6.3 Lower Bound of Detectable Tiles Projected into Scene

Generally, as the number of vertical tiles depicted in horizontal setup frames increases, the width of each vertical tile depicted in a corresponding horizontal scan image decreases. At a lower bound, a horizontal scan image may depict the scene illuminated at 50% intensity rather than discrete, alternating black and white vertical tiles across the width of the horizontal scan image. Therefore, in order to reduce sensitivity to horizontal scan images recorded concurrently with horizontal setup frames depicting higher-order vertical tiles and at a resolution limit of the camera, the peripheral control module can implement a grayscale threshold that is substantially greater than a median grayscale value. For example, the content application can implement a grayscale threshold of "180" for a 256-bit grayscale color channel when converting this grayscale image to black-and-white, as described above.

Alternatively, the peripheral control module can implement computer vision techniques to actively scan each horizontal scan image—recorded when horizontal setups frames of increasing order are projected by the projector—for clearly-delineated alternating black and white vertical tiles across the horizontal scan image; once the peripheral control module thus determines that a resolution of the camera has been reached and that black and white vertical tiles are no longer distinguishable in further horizontal scan images, the peripheral control module can then discard the last horizontal scan image and execute the foregoing methods and techniques to transform the preceding horizontal scan images recorded during the current scan cycle into a composite horizontal scan image. Similarly, the peripheral control module can generate setup frames up to a preset order, such as setup frames including black and white tiles down to but not less than four pixels in width.

In the foregoing implementation, generation of the composite horizontal scan image without higher-order scan images—recorded when higher-order horizontal setup frames were projected into the scene—may yield a composite horizontal scan image that includes clusters of horizontally-adjacent pixels containing identical (or very similar) pixel values. To compensate for this reduced resolution in the black-and-white composite horizontal scan—which is thus limited by the resolution of the camera—the peripheral control module can compress a cluster of horizontally-adjacent pixels containing the same pixel value (or similar pixel values) by: preserving a pixel containing this pixel value (or an average of these similar pixel values) and horizontally-centered within this horizontal cluster of pixels; and overwriting a "null" value to each other pixel in this cluster. Alternatively, the peripheral control module can implement similar methods and techniques to compress adjacent clusters of pixels in the black-and-white composite horizontal scan into discrete pixel columns on regular intervals, such as by averaging pixel values of horizontal lines of pixels on each side of a predefined pixel column in the black-and-white composite horizontal scan. The peripheral control module can subsequently derive a correspondence between this compressed pixel in the black-and-white composite horizontal scan (i.e., in the camera domain) and one pixel column in the projector.

The content application and/or the peripheral control module can implement similar methods and techniques when capturing and processing the set of vertical scan images during this scan cycle.

Figure 5:
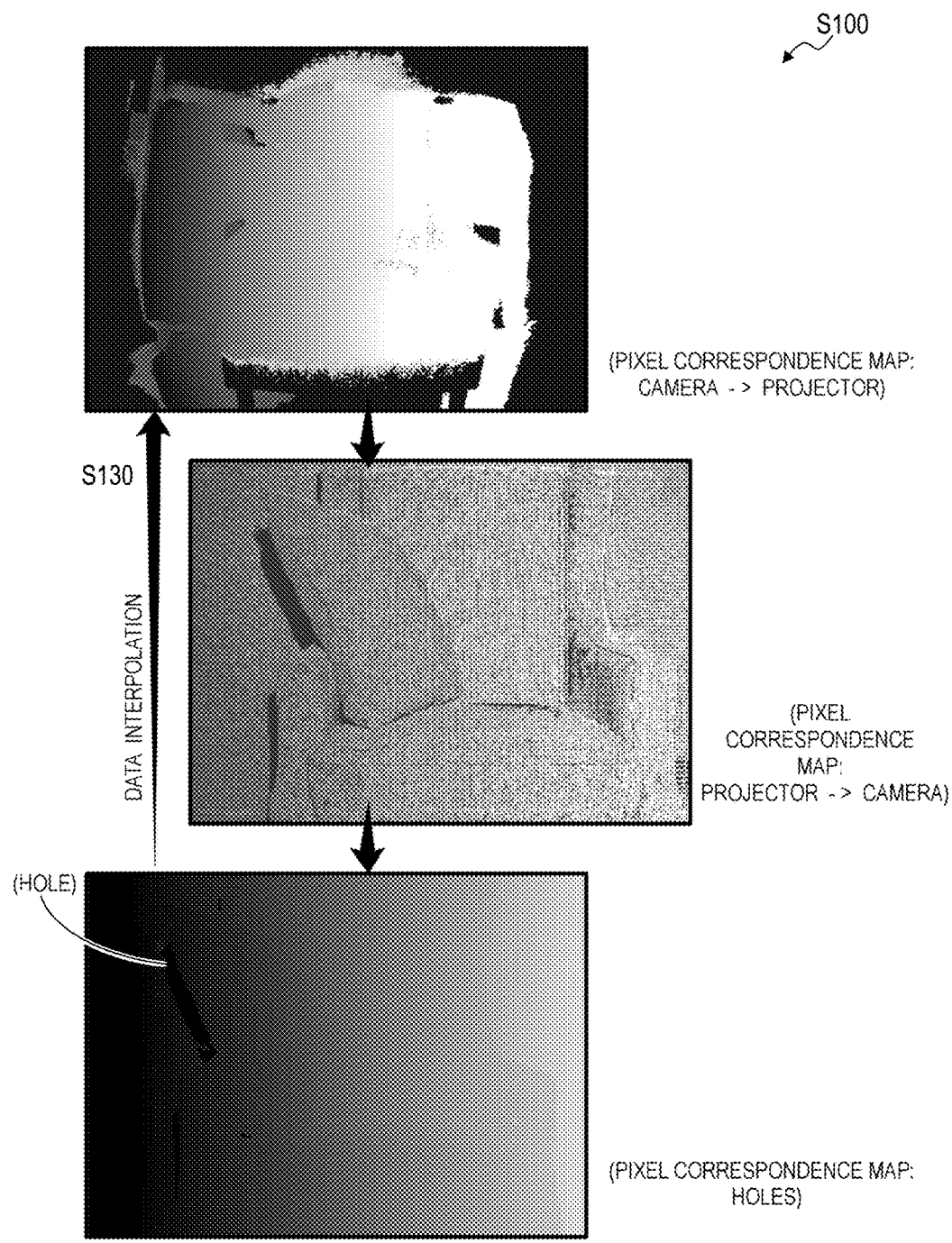
FIG. 5 is a flowchart representation of one variation of the method.
Figure 6:
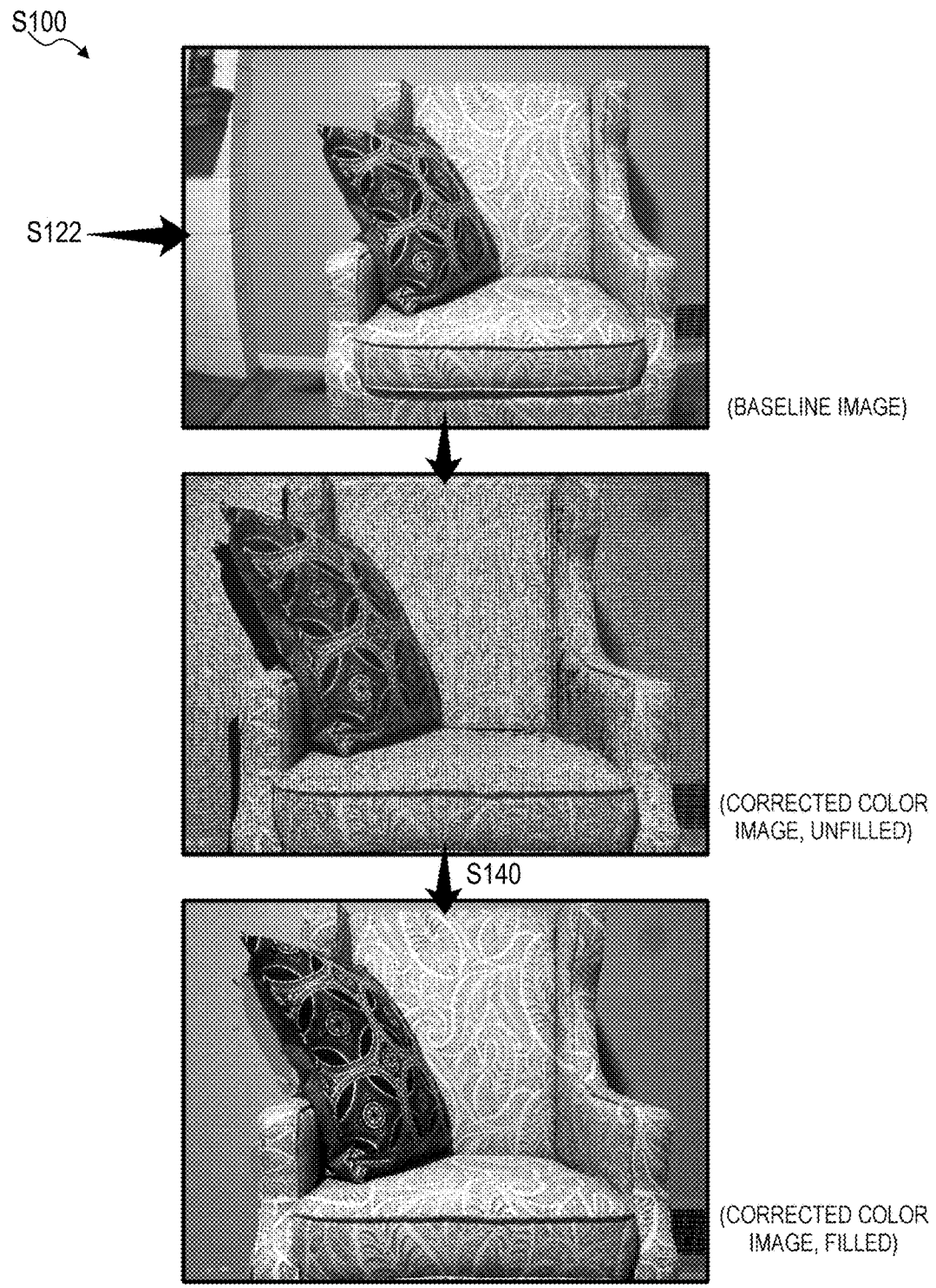
FIG. 6 is a flowchart representation of one variation of the method.

The peripheral control module can therefore: calculate correspondence between a sparse(r) set of pixels in the camera and a sparse(r) set of pixel columns in the projector; and calculate correspondence between a sparse(r) set of pixels in the camera and a sparse(r) set of pixel rows in the projector, as shown in FIGS. 3, 5, and 6. These sparse(r) correspondences may therefore manifest as a pixel correspondence map that contains "holes"—that is, excludes pixel correspondences from the camera domain into the projector domain.

6.4 Pixel Correspondence Map

The peripheral control module can then combine the black-and-white composite horizontal and vertical scan images to generate a pixel correspondence map that links a pixel at a particular (x, y) position in the camera domain to a particular pixel at a particular (x', y') position in the projector domain in Block S130. Subsequently, the peripheral control module can apply the pixel correspondence map to a color scan image of the scene recorded by the camera (i.e., a color scan image of the scene in the camera domain) to generate a corrected color image depicting the scene from the field of view of the projector (i.e., a corrected color image of the scene in the projector domain) in Block S140.

In one implementation, the peripheral control module initializes an empty pixel correspondence map at the resolution of the camera, wherein each pixel in the empty pixel correspondence map is assigned an (x, y) address in the camera domain and contains a null (x', y') value in the projector domain. For each pixel in the black-and-white composite horizontal scan, the peripheral control module then writes a pixel value of the pixel in the black-and-white composite horizontal scan to an x'-component of the corresponding pixel in the pixel correspondence map. Similarly, for each pixel in the black-and-white composite vertical scan, the peripheral control module writes a pixel value of the pixel in the black-and-white composite horizontal scan to a y'-axis component of the corresponding pixel in the pixel correspondence map. (The peripheral control module can also write or overwrite null values to each pixel in the pixel correspondence map that falls at a location outside of the derived field of view of the projector described above.)

Therefore, the peripheral control module can: transfer pixel values from the horizontal composite scan image to x'-component values of pixels at corresponding pixel addresses in the pixel correspondence map; and transfer pixel values from the vertical composite scan image to y'-component values of pixels at corresponding pixel addresses in the pixel correspondence map in Block S130. However, the peripheral control module can derive or represent the pixel correspondence map in any other way based on the set of scan images and corresponding setup frames in Block S130.

6.5 Pixel Correspondence Check

In one variation, the peripheral control module (or the content application) can check the pixel correspondence map for consistent and physically-possible correspondences between camera pixels and projector pixels in 3D space, such as by calculating a fundamental matrix of the pixel correspondence map. The peripheral control module can then remove (or "discard") any camera-to-projector-pixel correspondences in the pixel correspondence map that fail this check. (Such removal of camera-to-projector-pixel correspondences from the pixel correspondence map may thus manifest as "holes" in the correspondence map.)

7. Hole-Filling

Generally, for a scene with surfaces at different depths from the projector (or "relief"), surfaces in the field of view of the projector will be obscured in the field of view of the camera (i.e., not visible to the camera) due to a physical offset between the projector and the camera. Therefore, an image of the scene recorded by the camera may not contain data representing some surfaces in the field of view of the projector, thereby producing "holes" in the pixel correspondence map from the camera pixels to the projector pixels, as shown in FIG. 6.

Additionally, the camera may be characterized by a resolution less than and a view angle greater than the projector such that, on average, one pixel in the camera defines a field of view that intersects the fields of view of multiple pixels in the projector, thereby yielding "holes" in the pixel correspondence map due to scan images recorded by the camera containing less data than frames output by the projector (i.e., a resolution mismatch between an intersection of the fields of view of the camera and the projector).

Furthermore, resolution limitations of the camera may yield a sparse(r) set of pixel correspondences from the camera domain into the projector domain, and the peripheral control module can remove conflicting pixel correspondences, both of which may yield additional holes in the pixel correspondence map, as described above.

Therefore, the peripheral control module can interpolate between verified pixel correspondences in the pixel correspondence map in order to fill these holes as shown in FIG. 5. In particular, rather than leverage the pixel correspondence map to transform a color scan image recorded by the camera into a corrected color image in the projector's domain and then interpolate color values across holes in the corrected color image, the peripheral control module can instead interpolate spatial pixel correspondences across holes in the pixel correspondence map directly.

In one implementation, the peripheral control module (or the content application): detects a contiguous group (i.e., a row) of horizontally-adjacent pixels in the pixel correspondence map containing a null x'-component value; extracts a first x'-component value from a first pixel immediately to the left of the contiguous group in the pixel correspondence map; extracts a second x'-component value from a second pixel immediately to the right of the contiguous group in the pixel correspondence map; and writes nearest integer values—linearly interpolated across the contiguous group from the first x'-component value to the second x'-component value—to each pixel in the contiguous group of pixels in the pixel correspondence map. The component placement module can: repeat this process for other contiguous groups of horizontally-adjacent pixels containing null x'-component values; and implement similar methods and techniques to interpolate pixel correspondences for contiguous groups (i.e., columns) of vertically-adjacent pixels containing null y'-axis component values in the pixel correspondence map In another implementation, the peripheral control module: calculates a disparity map between the baseline image and an initial corrected color image generated from an unfilled pixel correspondence map; detects a first contiguous group of horizontally-adjacent pixels in the pixel correspondence map containing a null x'-component value; detects a second group of horizontally-adjacent pixels (e.g., a contiguous row of up to ten pixels) immediately adjacent, in-line with, and at the same depth as the first contiguous group of pixels based depth values indicated in on the disparity map; extracts a second series of x'-component values from the second group of pixels; and writes nearest integer values—extrapolated across the first contiguous group from the second series of x'-component values—to each pixel in the first contiguous group of pixels in the pixel correspondence map. For example, in response to detecting a contiguous group of horizontally-adjacent pixels containing null x'-component values, the peripheral control module can: isolate a first set of pixels (e.g., a contiguous row of up to ten pixels) immediately to the left of this group; isolate a second set of pixels (e.g., a contiguous row of up to ten pixels) immediately to the right of this group; and query the disparity map (or other 3D representation of the scene) to determine depths of surfaces in the scene represented by the first and second sets of pixels. If the first set of pixels falls on a first surface and the second set of pixels falls on a second surface discontinuous with the first surface and if the first surface falls at a greater depth than the second surface according to the 3D representation of the scene, the peripheral control module can: predict that this "hole" is due to a shadow between fields of view of the camera and the projector. Accordingly, the peripheral control module can selectively extrapolate x'-component values from the first set of pixels to fill this hole in the pixel correspondence map.

However, for holes not occurring between disparate surfaces, not occurring along edges, and/or not occurring at discontinuous surfaces in the scene, the peripheral control module can instead interpolate x'- and y'-axis component values across contiguous clusters of pixels containing null values in the pixel correspondence map, as in the implementation described above. However, the peripheral control module can implement any other method or technique to fill holes in the pixel correspondence map. The peripheral control module can then store this final, hole-filled pixel correspondence map in local memory and/or return this final, hole-filled pixel correspondence map and the baseline image to the content application.

In the foregoing implementation, to calculate the disparity map for the scene, the content application (or the peripheral control module) can first compute the correspondence map between the camera and projector, which includes a set of correspondences between pixel locations in the projector and the camera. The content application can then: rectify correspondences in the pixel correspondence map, such as by computing a perspective transformation for both the projector domain and camera domain (i.e., for image pixel grids for both the projector and the camera); computed differences in the x components of the rectified perspective transformations for the projector and camera domains; and store this result as the disparity map for the scene. (The content application can also render this disparity map as an image based on values contained therein.)

Therefore, the content application (or the peripheral control module) can calculate a disparity map for the scene and leverage values stored in the disparity map as a proxy for depth of corresponding surfaces in the scene, such as to fill holes in the pixel correspondence map as described above and/or to isolate discrete surfaces depicted in the corrected color image as described below.

8. Corrected Color Image

Block S140 of the method S100 recites transforming the baseline image into a corrected color image based on the pixel correspondence map, wherein the corrected color image depicts the scene from a perspective of the external projector. Generally, in Block S140, the peripheral control module (or the content application) can then apply the final, hole-filled pixel correspondence map to the baseline image to generate a corrected color image that depicts the scene from the perspective of the projector, as shown in FIG. 6. The content application can then interface with a user in subsequent Blocks of the method to manipulate this corrected color image, including inserting visual assets over regions in this corrected color image depicting objects and surfaces in the scene.

9. Variation: Second Sensor

In one variation, the peripheral control module includes a second sensor, such as a second 2D color camera or a depth sensor at a known offset from the (first) camera. In this variation, the peripheral control module can: record pairs of scan images through the camera and the second sensor in Block S120; can process these scan image pairs to generate a 3D representation of the scene, such as in the form of a depth map or a point cloud, in Block S130; can generate a pixel correspondence map (e.g., a 3D to 2D pixel correspondence map) for the projector based on this 3D representation of the scene; and then implement methods and techniques similar to those described above to fill holes in the pixel correspondence map.

10. Creator Window

Block S150 recites rendering the corrected color image in a creator window at a computing device; and Block S160 recites linking a set of visual assets to a set of discrete regions in the corrected color image, wherein each discrete region in the set of discrete regions in the corrected color image spans a discrete surface in the scene from the perspective of the external projector. Generally, in Block S150, the content application can render the corrected color image—which represents the current field of view of the projector—within a creator window at a computing device, such as directly connected to the peripheral control module via a wired or wireless connection or interfacing with the peripheral control module via a computer network, as shown in FIGS. 7, 8, and 9. In particular, the content application can present the corrected color image to a user via the creator window in Block S150 in order to enable the user to virtually augment surfaces in the scene with visual assets from the perspective of the projector in Block S160. The content application (and/or the component placement module) can then: generate augmented reality frames for the scene directly from visual assets assigned to regions of the corrected color image by the user; and serve these augmented reality frames to the projector, which projects these augmented reality frames onto the scene, thereby casting these visual assets—with high spatial alignment—onto corresponding surfaces in the scene.

10.1 Feature Detection

In one variation shown in FIG. 1, the content application: implements computer vision techniques to detect a corpus of objects in the corrected color image. For example, the content application can implement: blob detection to isolate regions in a corrected color image that exhibit different properties (e.g., brightness, color) relative to surrounding regions in the corrected color image; and edge detection to isolate bounds of discrete surfaces or objects depicted in the corrected color image. In another example, the content application: calculates a disparity map between the baseline image and the corrected color image; estimates depths of objects in the scene, relative to the external projector, based on the disparity map; and distinguishes objects, in the corrected color image, further based on depth discontinuities detected at corresponding locations in the disparity map. For example, the peripheral control module can: distinguish discrete regions in the corrected color image based on color similarities, color differences, and color gradients in the corrected color image; scan the disparity map for depth discontinuities; derive edges between discrete surfaces in the scene from these depth discontinuities; project these edges extracted from the disparity map onto the corrected color image; shift boundaries of discrete regions detected in the corrected color image into alignment with nearby edges extracted from the disparity map; and write (non-metric) depth information (e.g., average depth, depth range, depth gradient) from the disparity map to the corresponding regions in the corrected color image.

However, the content application can implement any other method or technique to automatically isolate groups of pixels (i.e., "discrete regions") in the corrected color image depicting objects, surfaces, and/or color regions, etc. in the scene.

10.2 Assets

As described above, the content application can also host a library of static and/or animated visual assets, such as: animated rain drops falling; an animated fire burning; an animated "worm" that follows a path and changes color over time or distance traversed; and an animated waterfall; etc.

The content application can also interface with a user to upload new (e.g., custom) visual assets to the library, such as: custom graphics; text strings with animated (e.g., bouncing, shimmering) characters; animated color patterns defining a boundary, colors within this boundary, and/or objects inside its boundary that move or change over time; etc.

The content application can further host or interface with an asset creator tool through which a user may create new visual assets or modify existing visual assets that are then added to the library.

The content application can also include an effect library containing effects than can be assigned to static and animated visual assets placed over the corrected color image within the creator window, such as: entry effects (e.g., wipe in, appear, drift in); exit effects (e.g., dissolve, compress, confetti, firework); and maintain effects (e.g., sparkle, shimmer). For example, the user may link one or several of these effects to a visual asset assigned to a discrete region in the corrected color image and define triggers and/or timers (i.e., durations) for these effects. For example, the user may link a particular visual asset—assigned to a particular region in the corrected color image—to an entry effect triggered by a condition in or near the scene, such as motion.

Visual assets can be similarly dynamic (e.g., parametric and responsive). For example, a visual asset can be animated at a speed proportional to a size (e.g., width and/or height) of its assigned region and position within a corrected color image. In another example, a visual asset can exhibit color changes as a function of time that the asset is rendered over the corrected color image in the creator window—depicted in augmented reality frames served to the projector. Similarly, a visual asset can contain an animated pattern that changes as a function of depth of a surface in the scene depicted in a region of the corrected color image assigned to the visual asset.

However, the content application can: store, load, and/or support visual assets of any other type, in any format, and depicting any other animation; can support any other types of effects; and support effect triggers of any other type.

10.3 Asset Assignment and Scene Augmentation

The peripheral control module can then interface with the user via the creator window to link visual assets, effects, and/or triggers to discrete (e.g., individual) regions in the corrected color image, each of which corresponds to an object, discrete surface, or discrete feature in the scene from the perspective of the projector.

In one implementation, the content application: highlights a corpus of objects—detected in the corrected color image by the content application—over the corrected color image in the creator window; and then receives from the user selection of a first object—in a corpus of objects—in the corrected color image. Then, in response to receiving selection of a first visual asset—from the virtual library—at the creator window, the computer system can link the first visual asset to a first discrete region in the corrected color image depicting the first object. The content application can also interface with the user to adjust a perimeter of a discrete region in the corrected color image, such as by enabling the user to manually drag the perimeter or a vertex along the perimeter around the discrete region to an edge depicted in the corrected color image.

The computer system can interface with the user to link an effect and entry effect trigger, a maintain effect (and duration), and/or an exit effect and exit effect trigger—selected by the user—to this first discrete region in the corrected color image. In the foregoing example, the content application can: calculate a disparity map between the baseline image and the corrected color image, as described above; estimate a first depth value of the first object or depth gradient across the first object in the scene, relative to the external projector, based on the disparity map; and define animation of the first visual asset over the first discrete region in the corrected color image as a function of the first depth value of the first object, such as with the visual asset scanning over this first discrete region and changing its color and/or pattern as a function of the depth gradient across the corresponding object in the scene.

The content application can then render the first asset over the first discrete region in the corrected color image at the creator window in order to visually communicate to the user how the first visual asset will be cast onto the scene by the projector. The content application can repeat this process for other objects and their corresponding regions detected in the corrected color image in order to populate the corrected color image with augmented background and foreground content, such as continuous augmented background content and response (i.e., triggered) augmented foreground content.

11. Augmented Reality Frame Generation

Block S170 of the method S100 recites generating a sequence of augmented reality frames depicting the set of visual assets aligned with the set of discrete regions in the corrected color image. Generally, in Block S170, the content application and/or the peripheral control module can render augmented reality frames that depict animated visual assets in locations corresponding to their assigned regions in the corrected color image such that these visual assets are visualized—with a high degree of spatial accuracy—over their corresponding surfaces in the scene when these augmented reality frames are output to the projector.

In one implementation, the content application: replays visual assets over the corrected color image within the creator window; and then generates a sequence of frames—at the resolution of the projector—depicting these replayed visual assets at a known frame rate of the projector (e.g., 24 frames per second, 60 frames per second). In particular, in this implementation, the content application can pre-render a sequence of augmented reality frames at the computing device, wherein this sequence of augmented reality frames depicts a set of visual assets animated across corresponding discrete regions in the corrected color image in Block S170. The content application can then upload these augmented reality frames to the peripheral control module, which can then stream these augmented reality frames to the projector, such as on a continuous loop while the projector and peripheral control module are in operation.

In another implementation shown in FIG. 1, the content application can: generate a set of background frames depicting a first subset of visual assets aligned with a first subset of discrete regions in the corrected color image representing background (e.g., "immutable") surfaces in the scene; generate an asset map defining locations of a second subset of visual assets aligned with a second subset of discrete regions in the corrected color image representing foreground (e.g., "mutable") surfaces in the scene and/or associated with entry or exit triggers; and output these background frames, the asset map, and the second subset of visual assets to the peripheral control module, which can store this augmented content in local memory. The peripheral control module can then: generate overlay masks containing the second subset of visual assets according to the asset map, such as responsive to triggers detected by the peripheral control module near the scene (e.g., motion via a connected or integrated motion sensor); overlay masks onto corresponding background frames, in the set of background frames, to render augmented reality frames in (near) real-time; and publish these augmented reality frames in (near) real-time.

In particular, in this implementation, the content application can: generate an asset map of regions in the corrected color image—and therefore surfaces in the projector's field of view—assigned to particular sets of visual assets; populate regions in the asset map with effects and triggers assigned to these visual assets; bundle this asset map—defined in the projector domain—with copies of this set of visual assets (e.g., digital asset files, asset masks); and publish this bundle to the peripheral control module for storage in local memory. Later, when the peripheral control module is active, the peripheral control module can: transform the asset map, effects, triggers, and visual assets into a sequence of frame overlays; combine these frame overlays with background frames pre-rendered by the content application to generate augmented reality frames; and then output these augmented reality frames to the projector.

However, the content application and/or the peripheral control module can implement any other method or technique to render a sequence of augmented reality frames for subsequent output to the projector.

12. Content Projection and Physical Object Animation

Block S180 of the method S100 recites serving the sequence of augmented reality frames to the external projector for projection onto the scene to cast depictions of the set of visual assets onto corresponding surfaces in the scene. Generally, in Block S180, the peripheral control module (or the content application) outputs augmented reality frames to the projector, such as: on a continuous loop; responsive to trigger conditions detected by a sensor (e.g., the camera or a motion sensor) connected to or integrated into the peripheral control module; or responsive to a manual trigger input.

12.1 Example: Bar Display

In one example shown in FIG. 7, the projector is suspended from a ceiling and faces a liquor bottle display in a bar, and the peripheral control module is mounted to the projector with the camera similarly facing the bottle display. The peripheral control module and/or the content application execute the foregoing processes to: output a sequence of setup frames that are projected onto the bottle display by the projector; record a series of scan images during this scan cycle; derive a pixel correspondence map for this projector and peripheral control module configuration from these setup frames and scan images; generate a corrected color image of the bottle display based on the pixel correspondence map; detect edges in the corrected color image; and derive a disparity map based on the scan images and the pixel correspondence map.

The content application can then: render the corrected color image within the creator window; distinguish a discrete region in the corrected color image—depicting an individual bottle selected by the user—based on detected edges in the corrected color image and a surface of the bottle represented in the disparity map; and highlight the bottle in the corrected color image. The user may then drag an animated visual asset—from the library—over this discrete region of the corrected color image in order to link this visual asset to the bounds of this bottle (in the field of view of the projector). The content application can interface with the user to repeat this process to link the same or other visual assets to other bottles depicted in the corrected color image.

Once the user confirms augmented content for the bottle display, the content application can generate a sequence of frames depicting these animations and publish these frames to the peripheral control module for local storage. The peripheral control module can then continuously stream these frames to the projector, which thus projects these augmented reality frames toward the bottle display to augment these bottles with these animations, such as up to but not beyond the edges of the bottles in the field of view of the projector.

12.2 Example: Retail Display

In another example shown in FIG. 8, the projector is located on a table and faces a retail display—including a firepit, tree cutouts, camping chairs, and a rain jacket—in a retail store, and the peripheral control module is mounted on or near the projector with the camera similarly facing the retail display. The peripheral control module and/or the content application can execute the foregoing processes to: calculate and render a corrected color image—representing the scene from the perspective of the projector—within the creator window; distinguish discrete regions in the corrected color image depicting each of the firepit, each tree cutout, each camping chair, and the rain jacket and a background region around these discrete regions; and then highlight these discrete regions in the corrected color image. The user may then: drag a first animated visual asset depicting falling raindrops onto the background region and onto the camping chair regions; modify the first animated visual asset to depict raindrops bouncing—from a boundary between the background region and the rain jacket region—into the background region; insert animated retail-related text over a portion of the background region; insert a "glowing" effect over the tree cutout regions and assign a brightness (e.g., 15%) and a color (e.g., "light orange") to this glowing effect; and drag a second animated visual asset depicting flames onto the firepit region. The content application can also interface with the user: to define the second animated visual asset depicting flames and the animated retail-related text as perpetual; and to assign a motion trigger for projecting the first animated visual asset and the glowing effects into the scene and a duration of time to project the first animated visual asset and the glowing effects into the scene (e.g., one minute) after motion is detected.

Once the user confirms this augmented content for the retail display, the content application can: generate a sequence of background frames depicting the second animated visual asset and the animated retail-related text; generate an asset map for the first animated visual asset and the glowing effects; and publish these background frames. the asset map, the first animated visual asset, and the glowing effects to the peripheral control module for local storage. The peripheral control module can then continuously stream the background frames to the projector, which thus projects these background frames onto the retail display to augment the firepit with a flame animation. However, once a motion sensor integrated into or connected to the peripheral control module detects motion within the scene (e.g., a patron present near the scene), the peripheral control module can generate overlay frames depicting the first animated visual asset and the glowing effects, overlay these overlay frames onto the background frames to generate new, responsive augmented reality frames, and publish these augmented reality frames to the projector for the specified duration of time.

13. Automatic Update

Figure 2:
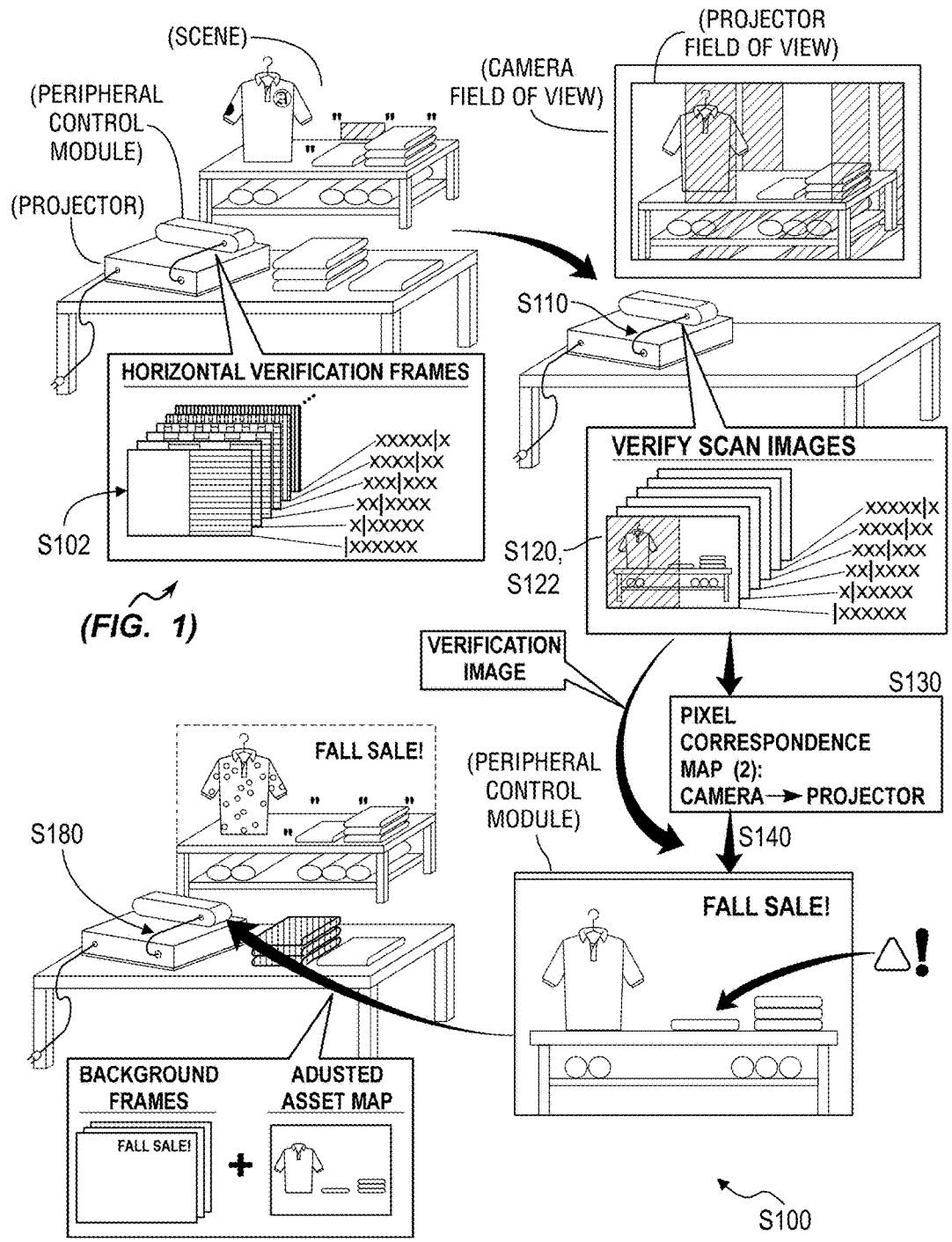
FIG. 2 is a flowchart representation of one variation of the method.

In one variation shown in FIGS. 1 and 2, the peripheral control module automatically detects a change in a position of an object in the scene (or a change in position of the projector and/or peripheral control module relative to the scene) and automatically adjusts the position of a corresponding asset rendered in augmented reality frames served to the projector.

13.1 Verification Image

In one implementation, the peripheral control module repeats Block S122 intermittently throughout operation (e.g., when disconnected from the computing device) to record a verification image (or a sequence of verification images), such as: when manually triggered by the user; according to a schedule set by the user (e.g., once per hour or once daily); or after the peripheral control module detects motion in or near the scene (e.g., via the camera or via a motion sensor integrated into the peripheral control module) followed by a period of no detected movement in or near the scene. (In this implementation, the peripheral control module can also a serve a "white" frame to the projector in order to illuminate the scene when recording the verification image as described above, thereby minimizing differences between the verification image and the baseline image due to ambient light conditions near the scene.)

After recording a verification image of the scene, the peripheral control module can compare the verification image to the baseline image to determine whether a change has occurred in the scene since the baseline image was recorded. For example, the peripheral control module can implement motion detection techniques to compare the baseline color image to the verification image and to determine whether a surface or object within the scene has changed or moved and a degree of this change. The peripheral control module can then automatically shift (e.g., "warp") augmented reality frames or adjust the asset map generated for this scene to compensate for a detected change, such as if the degree of this change exceeds a minimum change threshold (and is less than a maximum change threshold). (The peripheral control module can also execute this process for multiple verification images to characterize changes within the scene, discard outlier characterizations, and selectively update the augmented reality frames or asset map responsive to a verified change in the scene.)

13.2 Direct Update from Verification Image

In one implementation, in response to detecting a change in the scene based on a difference between the baseline and verification images, the peripheral control module can: crop the baseline and verification images according to the derived field of view of the projector; calculate a warp, in the camera domain, that projects features in the baseline image onto corresponding features in the verification image; (verify the change in the scene if a scope of the warp exceeds a threshold scope); transform the warp from the camera domain to the projector domain based on the pixel correspondence map generated during the preceding scan cycle; and apply the warp, in the projector domain, to a set of rendered augmented reality frames to generate a sequence of adjusted augmented reality frames. The peripheral control module can additionally or alternatively apply the warp, in the projector domain, to background frames and to the asset map stored in local memory and then implement these adjusted background frames and the adjusted asset map to generate adjusted augmented reality frames. The peripheral control module can then serve these adjusted augmented reality frames to the external projector for projection onto the scene, thereby casting depictions of the set of visual assets onto corresponding surfaces in the scene that moved between recordation of the baseline image and the verification image.

13.3 Second Scan Cycle

In another implementation, the component placement module can execute a second scan cycle at a second time (e.g., when triggered manually or on a scheduled interval), as described above, in order to record a second set of scan images and to derive a second pixel correspondence map, calculate a second disparity map for the current state of the scene, and generate a second corrected color image representing the field of view of the projector. The peripheral control module can then compare the (original) disparity map to the second disparity map to determine if all surfaces greater than a minimum size previously present in the field of view of the projector are still present in the scene and to verify that the previous depths of these surfaces have not changed by more than a threshold (dimensionless) distance. If the peripheral control module thus confirms that all of these (relatively large) surfaces are still present in the scene and have not changed distance from the projector by more than a threshold (dimensionless) distance, the peripheral control module can then: calculate a warp that maps the (original) corrected color image to the second corrected color image; and characterize a magnitude of the warp, which may represent magnitudes of changes in horizontal and vertical positions of surfaces in the scene within the field of view of the projector. If the magnitude (or "scope") of this warp is less than a threshold magnitude, the peripheral control module can apply the warp to the augmented reality frames in order to realign visual assets depicted in these augmented reality frames to their corresponding surfaces in the scene before outputting these augmented reality frames to the projector.

However, if the peripheral control module determines that a (relatively large) surface in the scene has changed depth, horizontal position, and/or vertical position in the field of view of the projector since the preceding scan cycle by more than a threshold (dimensionless) distance, the peripheral control module can instead return a prompt to the user to relink these visual assets to regions in the new corrected color image of the modified scene, such as by serving this prompt through the content application or by outputting a frame containing this prompt to the projector.

In a similar example, the peripheral control module can: serve a second sequence of setup frames to the external projector in Block S110; record a second set of scan images in Block S120, wherein each scan image in this second set of scan images is recorded during projection of a corresponding setup frame in the second sequence of setup frames onto the scene; record a verification image depicting the scene in the field of view of the camera in Block S122; calculate a second pixel correspondence map based on pixel values in scan images in the second set of scan images and pixel values in corresponding setup frames in the second sequence of setup frames in Block S130; and transform the verification image into a second corrected color image based on the second pixel correspondence map in Block S140, wherein the second corrected color image depicts the scene from the perspective of the external projector. The peripheral control module can then warp the asset map to align discrete regions—assigned to a subset of visual assets linked to mutable objects—in the asset map with corresponding features detected in the second corrected color image. In particular, the peripheral control module can: implement computer vision techniques to detect features, objects, edges, etc. in the second corrected color image and then link regions defined in the asset map to surfaces of similar position, size, color, and/or geometry, etc. detected in the second corrected color image. The peripheral control module can then: generate overlay masks including this subset of visual assets according to this warped asset map; overlay these overlay masks onto corresponding unchanged background frames to generate a sequence of adjusted augmented reality frames in Block S170; and serve the sequence of adjusted augmented reality frames to the external projector for projection onto the scene to cast depictions of the set of visual assets onto corresponding mutable surfaces in the scene that moved during the first period of time in Block S180.

In particular, in this example, regions linked to visual assets in the asset map can correspond to surfaces of interest—specified by the user—in the field of view of the projector. The peripheral control module can thus compare augmented regions defined in the asset map to features detected in the scene during this later scan cycle to determine whether a surface of interest has changed position or orientation within the scene. If so, the peripheral control module can automatically adjust augmented reality frames to align with these surfaces of interest, such as regardless of changes in position of other objects or surfaces in the scene that are not of interest. Furthermore, in this example, if the peripheral control module fails to detect a surface in the current scene matched to an augmented region defined in the asset map, the peripheral control module can remove the corresponding asset from augmented reality frames subsequently output to the projector. The peripheral control module can therefore modify augmented reality frames responsive not only to changes in position of surfaces of interest in the scene but also removal of surfaces of interest from the scene.

However, in this implementation, if the peripheral control module fails to determine correspondence between features, objects, edges, etc. detected in the second corrected color image and the asset map or augmented reality frames, the peripheral control module can store the second corrected color image and prompt the user to relink visual assets to regions in the second corrected color image in order to compensate for a change in the scenes since the preceding scan cycle.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method for augmenting a scene in real space with projected visual content comprising:
    serving a sequence of setup frames to an external projector facing the scene;
    at a peripheral control module comprising a camera facing the scene:
        recording a set of scan images, each scan image in the set of scan images recorded during projection of a corresponding setup frame in the sequence of setup frames;
        recording a baseline image depicting the scene in a field of view of the camera;

calculating a pixel correspondence map based on pixel values in each scan image in the set of scan images and pixel values in corresponding setup frames in the sequence of setup frames;

transforming the baseline image into a corrected color image based on the pixel correspondence map, the corrected color image depicting the scene from a perspective of the external projector;

rendering the corrected color image in a creator window at a computing device;

linking a set of visual assets to a set of discrete regions in the corrected color image, each discrete region in the set of discrete regions in the corrected color image spanning a discrete surface in the scene from the perspective of the external projector;

at the computing device, pre-rendering a sequence of augmented reality frames depicting the set of visual assets aligned with the set of discrete regions in the corrected color image and animated across corresponding discrete regions in the corrected color image; and streaming the sequence of augmented reality frames to the external projector for projection onto the scene to cast depictions of the set of visual assets onto corresponding surfaces in the scene over a first period of time.

2. The method of claim 1:

wherein serving the sequence of setup frames to the external projector comprises, at the peripheral control module physically mounted to an exterior of the external projector, sequentially serving the sequence of setup frames to the external projector;

wherein recording the set of scan images comprises, via a two-dimensional color camera integrated into the peripheral control module, recording each scan image in the set of scan images responsive to serving a next setup frame in the sequence of setup frames to the external projector;

wherein rendering the corrected color image in the creator window comprises rendering the corrected color image in the creator window at the computing device communicatively coupled to the peripheral control module;

further comprising storing the sequence of augmented reality frames in local memory in the peripheral control module; and wherein serving the sequence of augmented reality frames to the external projector comprises, at the peripheral control module, serving the sequence of augmented reality frames from local memory to the external projector when the computing device is disconnected from the peripheral control module.

3. The method of claim 1:

further comprising:
querying the external projector for a resolution of the external projector;
generating a sequence of horizontal setup frames, in the sequence of setup frames, at the resolution of the external projector, each horizontal setup frame in the sequence of horizontal setup frames comprising a unique distribution of alternating columns of black pixels and columns of white pixels;

wherein recording the set of scan images comprises recording the set of horizontal scan images, each horizontal scan image in the set of horizontal scan images recorded during projection of a corresponding horizontal setup frame in the sequence of horizontal setup frames;

wherein calculating the pixel correspondence map comprises:
converting each horizontal scan image in the set of horizontal scan images into a black-and-white horizontal scan image; and
compiling the set of black-and-white horizontal scan images into a horizontal composite scan image comprising an array of pixels, each pixel in the array of pixels:
assigned a pixel address corresponding to a particular pixel in the camera; and
comprising a horizontal pixel value corresponding to a horizontal address of a column of pixels in the external projector defining a columnar field of view that intersects a field of view of the particular pixel in the camera at a surface in the scene.

4. The method of claim 3:

wherein generating the sequence of horizontal setup frames comprises:
generating a first horizontal setup frame comprising a first array of pixels at the resolution of the external projector, each pixel in the first array of pixels comprising a "0" value in a first characteristic position of a binary horizontal address of the pixel assigned a black pixel value, and each pixel in the first array of pixels comprising a "1" value in the first characteristic position of a binary horizontal address of the pixel assigned a white pixel value;
generating a second horizontal setup frame comprising a second array of pixels at the resolution of the external projector, each pixel in the second array of pixels comprising a "0" value in a second characteristic position of a binary horizontal address of the pixel assigned a black pixel value, and each pixel in the second array of pixels comprising a "1" value in the second characteristic position of a binary horizontal address of the pixel assigned a white pixel value;

wherein recording the set of horizontal scan images comprises:
recording a first horizontal scan image when the first horizontal scan image is cast onto the scene by the external projector;
recording a second horizontal scan image when the second horizontal scan image is cast onto the scene by the external projector;

wherein compiling the set of black-and-white horizontal scan images into the horizontal composite scan image comprises calculating the horizontal composite scan image based on a sum of:
the first black-and-white horizontal scan image, weighted based on a first value of the first characteristic position; and
the second black-and-white horizontal scan image, weighted based on a second value of the second characteristic position;

wherein calculating the pixel correspondence map comprises writing pixel values in the horizontal composite scan image to x-component values of pixels at corresponding pixel addresses in the pixel correspondence map.

5. The method of claim 1:

further comprising:
serving a first boundary mapping frame to the external projector, the first boundary mapping frame depicting a sparse grid array of white dots over a black background;

recording a first boundary scan image during projection of the first boundary mapping frame by the external projector;
serving a second boundary mapping frame to the external projector, the second boundary mapping frame depicting an inverse of the first boundary mapping frame;
recording a second boundary scan image during projection of the second boundary mapping frame by the external projector;
converting the first boundary mapping scan image and the second boundary scan image to black and white;
subtracting the second boundary scan image from the first boundary scan image to calculate a composite boundary scan image;
isolating a set of pixel clusters in the composite boundary scan image containing values greater than a threshold value; and
calculating a perimeter that encompasses the set of pixel clusters, the perimeter representing a boundary of the scene in a field of view of the external projector; and
wherein transforming the baseline image into the corrected color image comprises transforming pixels, inside the perimeter, in the baseline image into the corrected color image based on the pixel correspondence map.

6. The method of claim 1, further comprising:
detecting a contiguous group of horizontally-adjacent pixels in the pixel correspondence map containing a null x-component value;
extracting a first x-component value from a first pixel immediately to the left of the contiguous group in the pixel correspondence map;
extracting a second x-component value from a second pixel immediately to the right of the contiguous group in the pixel correspondence map; and
writing nearest integer values, linearly interpolated across the contiguous group from the first x-component value to the second x-component value, to each pixel in the contiguous group of pixels in the pixel correspondence map.

7. The method of claim 1, further comprising:
calculating a disparity map between the baseline image and the corrected color image;
detecting a first contiguous group of horizontally-adjacent pixels in the pixel correspondence map containing a null x-component value;
detecting a second group of horizontally-adjacent pixels immediately adjacent, in-line with, and at a common depth with the first contiguous group of pixels in the pixel correspondence map based on the disparity map;
extracting a second series of x-component values from the second group of pixels; and
writing nearest integer values, extrapolated across the first contiguous group from the second series of x-component values, to each pixel in the first contiguous group of pixels in the pixel correspondence map.

8. The method of claim 1:
further comprising:
implementing computer vision techniques to detect a corpus of objects in the corrected color image; and
highlighting the corpus of objects over the corrected color image in the creator window; and
wherein linking the set of visual assets to the set of discrete regions in the corrected color image comprises:
receiving selection of a first object, in the corpus of objects, in the corrected color image; and
in response to receiving selection of a first visual asset, in a virtual library of visual assets at the creator window, linking the first visual asset to a first discrete region in the corrected color image depicting the first object.

9. The method of claim 8, further comprising:
calculating a disparity map between the baseline image and the corrected color image;
estimating depths of objects in the scene, relative to the external projector, based on the disparity map;
distinguishing objects, in the corpus of objects, further based on depth discontinuities detected at corresponding locations in the disparity map.

10. The method of claim 8:
further comprising:
calculating a disparity map between the baseline image and the corrected color image;
estimating a first depth value of the first object in the scene, relative to the external projector, based on the disparity map; and
defining animation of the first visual asset over the first discrete region in the corrected color image as a function of the first depth value of the first object; and
wherein generating the sequence of augmented reality frames comprises generating the sequence of augmented reality frames depicting the first visual asset animated across the first discrete region.

11. The method of claim 1, further comprising:
at conclusion of the first period of time, recording a verification image of the scene via the camera;
calculating a warp, in a camera domain, that projects features in the baseline image onto corresponding features in the verification image; and
in response to a scope of the warp exceeding a threshold scope:
transform the warp from the camera domain to an external projector domain based on the pixel correspondence map;
applying the warp, in the external projector domain, to the sequence of augmented reality frames to generate a sequence of adjusted augmented reality frames; and
following the first period of time, serving the sequence of adjusted augmented reality frames to the external projector for projection onto the scene to cast depictions of the set of visual assets onto corresponding surfaces in the scene that moved during the first period of time.

12. The method of claim 1, wherein generating the sequence of augmented reality frames comprises:
at the computing device:
generating a set of background frames depicting a first subset of visual assets aligned with a first subset of discrete regions in the corrected color image representing immutable surfaces in the scene; and
generating an asset map defining locations of a second subset of visual assets aligned with a second subset of discrete regions in the corrected color image representing mutable surfaces in the scene; and
at the peripheral control module:
storing the set of background frames, the asset map, and the second subset of visual assets in local memory;

generating overlay masks comprising the second subset of visual assets according to the asset map; and
overlaying overlay masks onto corresponding background frames, in the set of background frames, to generate the sequence of augmented reality frames.

13. The method of claim 12:
wherein generating the asset map comprises generating the asset map assigning a motion trigger to a first visual asset, in the second subset of visual assets, assigned to a first discrete region, in the second subset of discrete regions, in the corrected color image;
further comprising, detecting motion proximal the scene based on an output of a motion sensor integrated into the peripheral control module;
wherein generating overlay masks comprises, in response to detecting motion proximal the scene, generating a first sequence of overlay masks depicting animation of the first visual asset within the first discrete region;
wherein overlaying overlay masks onto corresponding background frames comprises overlaying the first sequence of overlay masks onto background frames to generate a first sequence of augmented reality frames; and
wherein serving the sequence of augmented reality frames to the external projector comprises serving the first sequence of augmented reality frames to the external projector in response to detecting motion proximal the scene.

14. The method of claim 12:
wherein serving the sequence of augmented reality frames to the external projector comprises streaming the sequence of augmented reality frames to the external projector over a first period of time;
further comprising, at the peripheral control module, disconnected from the computing device, following the first period of time:
serving a second sequence of setup frames to the external projector;
at the peripheral control module:
recording a second set of scan images, each scan image in the second set of scan images recorded during projection of a corresponding setup frame in the second sequence of setup frames;
recording a verification image depicting the scene in the field of view of the camera;
calculating a second pixel correspondence map based on pixel values in scan images in the second set of scan images and pixel values in corresponding setup frames in the second sequence of setup frames;
transforming the verification image into a second corrected color image based on the second pixel correspondence map, the second corrected color image depicting the scene from the perspective of the external projector;
warping the asset map to align the second subset of discrete regions assigned to the second subset of visual assets in the asset map with corresponding features detected in the second corrected color image;
generating overlay masks comprising the second subset of visual assets according to the asset map;
overlaying overlay masks onto corresponding background frames, in the set of background frames, to generate a sequence of adjusted augmented reality frames; and
serving the sequence of adjusted augmented reality frames to the external projector for projection onto the scene to cast depictions of the set of visual assets onto corresponding mutable surfaces in the scene that moved during the first period of time.

15. The method of claim 1:
wherein serving the sequence of augmented reality frames to the external projector comprises streaming the sequence of augmented reality frames to the external projector over a first period of time;
further comprising, at the peripheral control module disconnected from the computing device:
at conclusion of the first period of time, recording a verification image of the scene via the camera;
calculating a warp, in a camera domain, that projects features in the baseline image onto corresponding features in the verification image; and
in response to a scope of the warp exceeding a threshold scope:
serving a second sequence of setup frames to the external projector;
recording a second set of scan images, each scan image in the second set of scan images recorded during projection of a corresponding setup frame in the second sequence of setup frames;
recording a verification image depicting the scene in the field of view of the camera;
calculating a second pixel correspondence map based on pixel values in scan images in the second set of scan images and pixel values in corresponding setup frames in the second sequence of setup frames;
transforming the verification image into a second corrected color image based on the second pixel correspondence map, the second corrected color image depicting the scene from the perspective of the external projector; and
outputting a prompt to relink the set of visual assets to a second set of discrete regions in the second corrected color image.

16. A method for augmenting a scene in real space with projected visual content comprising:
serving a set of setup frames to an external projector facing the scene;
at a peripheral control module comprising a camera facing the scene:
recording a set of images during projection of corresponding setup frames onto the scene by the external projector; and
recording a baseline image depicting the scene in a field of view of the camera;
calculating a pixel correspondence map based on the set of images and the set of setup frames;
transforming the baseline image into a corrected color image, depicting the scene in the field of view of the camera, based on the pixel correspondence map;
linking a set of visual assets to a set of discrete regions in the corrected color image;
at the computing device, pre-rendering a sequence of augmented reality frames depicting the set of visual assets aligned with the set of discrete regions in the corrected color image and animated across corresponding discrete regions in the corrected color image; and
streaming the set of augmented reality frames to the external projector for projection onto the scene to cast depictions of the set of visual assets onto surfaces, in the scene, corresponding to the set of discrete regions over a first period of time.

17. A method for augmenting a scene in real space with projected visual content comprising:
serving a sequence of setup frames to an external projector facing the scene;
serving a first boundary mapping frame to the external projector, the first boundary mapping frame depicting a sparse grid array of white dots over a black background;
serving a second boundary mapping frame to the external projector, the second boundary mapping frame depicting an inverse of the first boundary mapping frame;
at a peripheral control module comprising a camera facing the scene:
recording a set of scan images, each scan image in the set of scan images recorded during projection of a corresponding setup frame in the sequence of setup frames;
recording a baseline image depicting the scene in a field of view of the camera;
recording a first boundary scan image during projection of the first boundary mapping frame by the external projector;
recording a second boundary scan image during projection of the second boundary mapping frame by the external projector;
calculating a pixel correspondence map based on pixel values in each scan image in the set of scan images and pixel values in corresponding setup frames in the sequence of setup frames;
converting the first boundary mapping scan image and the second boundary scan image to black and white;
subtracting the second boundary scan image from the first boundary scan image to calculate a composite boundary scan image;
isolating a set of pixel clusters in the composite boundary scan image containing values greater than a threshold value; and
calculating a perimeter that encompasses the set of pixel clusters, the perimeter representing a boundary of the scene in a field of view of the external projector; and
transforming pixels, inside the perimeter, in the baseline image into a corrected color image based on the pixel correspondence map, the corrected color image depicting the scene from a perspective of the external projector;
rendering the corrected color image in a creator window at a computing device;
linking a set of visual assets to a set of discrete regions in the corrected color image, each discrete region in the set of discrete regions in the corrected color image spanning a discrete surface in the scene from the perspective of the external projector;
generating a sequence of augmented reality frames depicting the set of visual assets aligned with the set of discrete regions in the corrected color image; and
serving the sequence of augmented reality frames to the external projector for projection onto the scene to cast depictions of the set of visual assets onto corresponding surfaces in the scene.

18. A method for augmenting a scene in real space with projected visual content comprising:
serving a sequence of setup frames to an external projector facing the scene;
at a peripheral control module comprising a camera facing the scene:
recording a set of scan images, each scan image in the set of scan images recorded during projection of a corresponding setup frame in the sequence of setup frames;
recording a baseline image depicting the scene in a field of view of the camera;
calculating a pixel correspondence map based on pixel values in each scan image in the set of scan images and pixel values in corresponding setup frames in the sequence of setup frames;
detecting a contiguous group of horizontally-adjacent pixels in the pixel correspondence map containing a null x-component value;
extracting a first x-component value from a first pixel immediately to the left of the contiguous group in the pixel correspondence map;
extracting a second x-component value from a second pixel immediately to the right of the contiguous group in the pixel correspondence map;
writing nearest integer values, linearly interpolated across the contiguous group from the first x-component value to the second x-component value, to each pixel in the contiguous group of pixels in the pixel correspondence map;
transforming the baseline image into a corrected color image based on the pixel correspondence map, the corrected color image depicting the scene from a perspective of the external projector;
rendering the corrected color image in a creator window at a computing device;
linking a set of visual assets to a set of discrete regions in the corrected color image, each discrete region in the set of discrete regions in the corrected color image spanning a discrete surface in the scene from the perspective of the external projector;
generating a sequence of augmented reality frames depicting the set of visual assets aligned with the set of discrete regions in the corrected color image; and
serving the sequence of augmented reality frames to the external projector for projection onto the scene to cast depictions of the set of visual assets onto corresponding surfaces in the scene.

19. A method for augmenting a scene in real space with projected visual content comprising:
serving a sequence of setup frames to an external projector facing the scene;
at a peripheral control module comprising a camera facing the scene:
recording a set of scan images, each scan image in the set of scan images recorded during projection of a corresponding setup frame in the sequence of setup frames;
recording a baseline image depicting the scene in a field of view of the camera;
calculating a pixel correspondence map based on pixel values in each scan image in the set of scan images and pixel values in corresponding setup frames in the sequence of setup frames;
calculating a disparity map between the baseline image and the corrected color image;
detecting a first contiguous group of horizontally-adjacent pixels in the pixel correspondence map containing a null x-component value;
detecting a second group of horizontally-adjacent pixels immediately adjacent, in-line with, and at a common depth with the first contiguous group of pixels in the pixel correspondence map based on the disparity map;

extracting a second series of x-component values from the second group of pixels;

writing nearest integer values, extrapolated across the first contiguous group from the second series of x-component values, to each pixel in the first contiguous group of pixels in the pixel correspondence map;

transforming the baseline image into a corrected color image based on the pixel correspondence map, the corrected color image depicting the scene from a perspective of the external projector;

rendering the corrected color image in a creator window at a computing device;

linking a set of visual assets to a set of discrete regions in the corrected color image, each discrete region in the set of discrete regions in the corrected color image spanning a discrete surface in the scene from the perspective of the external projector;

generating a sequence of augmented reality frames depicting the set of visual assets aligned with the set of discrete regions in the corrected color image; and serving the sequence of augmented reality frames to the external projector for projection onto the scene to cast depictions of the set of visual assets onto corresponding surfaces in the scene.

20. A method for augmenting a scene in real space with projected visual content comprising:

serving a sequence of setup frames to an external projector facing the scene;

at a peripheral control module comprising a camera facing the scene:
   recording a set of scan images, each scan image in the set of scan images recorded during projection of a corresponding setup frame in the sequence of setup frames;
   recording a baseline image depicting the scene in a field of view of the camera;
   calculating a pixel correspondence map based on pixel values in each scan image in the set of scan images and pixel values in corresponding setup frames in the sequence of setup frames;
   transforming the baseline image into a corrected color image based on the pixel correspondence map, the corrected color image depicting the scene from a perspective of the external projector;
   rendering the corrected color image in a creator window at a computing device;
   linking a set of visual assets to a set of discrete regions in the corrected color image, each discrete region in the set of discrete regions in the corrected color image spanning a discrete surface in the scene from the perspective of the external projector;

at the computing device:
   generating a set of background frames depicting a first subset of visual assets aligned with a first subset of discrete regions in the corrected color image representing immutable surfaces in the scene; and
   generating an asset map defining locations of a second subset of visual assets aligned with a second subset of discrete regions in the corrected color image representing mutable surfaces in the scene; and at the peripheral control module:
   storing the set of background frames, the asset map, and the second subset of visual assets in local memory;
   generating overlay masks comprising the second subset of visual assets according to the asset map; and
   overlaying overlay masks onto corresponding background frames, in the set of background frames, to generate a sequence of augmented reality frames depicting the set of visual assets aligned with the set of discrete regions in the corrected color image; and
   serving the sequence of augmented reality frames to the external projector for projection onto the scene to cast depictions of the set of visual assets onto corresponding surfaces in the scene.

21. A method for augmenting a scene in real space with projected visual content comprising:

serving a sequence of setup frames to an external projector facing the scene;

at a peripheral control module comprising a camera facing the scene:
   recording a set of scan images, each scan image in the set of scan images recorded during projection of a corresponding setup frame in the sequence of setup frames;
   recording a baseline image depicting the scene in a field of view of the camera;
   calculating a pixel correspondence map based on pixel values in each scan image in the set of scan images and pixel values in corresponding setup frames in the sequence of setup frames;
   transforming the baseline image into a corrected color image based on the pixel correspondence map, the corrected color image depicting the scene from a perspective of the external projector;
   rendering the corrected color image in a creator window at a computing device;
   linking a set of visual assets to a set of discrete regions in the corrected color image, each discrete region in the set of discrete regions in the corrected color image spanning a discrete surface in the scene from the perspective of the external projector;
   generating a sequence of augmented reality frames depicting the set of visual assets aligned with the set of discrete regions in the corrected color image; and
   streaming the sequence of augmented reality frames to the external projector for projection onto the scene to cast depictions of the set of visual assets onto corresponding surfaces in the scene over a first period of time;

at the peripheral control module disconnected from the computing device:
   at conclusion of the first period of time, recording a verification image of the scene via the camera;
   calculating a warp, in a camera domain, that projects features in the baseline image onto corresponding features in the verification image; and
   in response to a scope of the warp exceeding a threshold scope:
      serving a second sequence of setup frames to the external projector;
      recording a second set of scan images, each scan image in the second set of scan images recorded during projection of a corresponding setup frame in the second sequence of setup frames;
      recording a verification image depicting the scene in the field of view of the camera;
      calculating a second pixel correspondence map based on pixel values in scan images in the second set of scan images and pixel values in corresponding setup frames in the second sequence of setup frames;
      transforming the verification image into a second corrected color image based on the second pixel correspondence map, the second corrected color image depicting the scene from the perspective of the external projector; and outputting a prompt to relink the set of visual assets to a second set of discrete regions in the second corrected color image.

* * * * *